United States Patent
Maeda et al.

(10) Patent No.: US 10,567,778 B2
(45) Date of Patent: Feb. 18, 2020

(54) IMAGE ENCODING APPARATUS, IMAGE ENCODING METHOD, RECORDING MEDIUM AND PROGRAM, IMAGE DECODING APPARATUS, IMAGE DECODING METHOD, AND RECORDING MEDIUM AND PROGRAM

(71) Applicant: CANON KABUSHIKI KAISHA, Tokyo (JP)

(72) Inventors: Mitsuru Maeda, Tokyo (JP); Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/110,877

(22) Filed: Aug. 23, 2018

(65) Prior Publication Data
US 2018/0367807 A1 Dec. 20, 2018

Related U.S. Application Data

(63) Continuation of application No. 14/904,404, filed as application No. PCT/JP2014/003506 on Jul. 1, 2014, now Pat. No. 10,085,033.

(30) Foreign Application Priority Data
Jul. 12, 2013 (JP) ................................. 2013-146305

(51) Int. Cl.
*H04N 19/30* (2014.01)
*H04N 19/105* (2014.01)
(Continued)

(52) U.S. Cl.
CPC ........... *H04N 19/30* (2014.11); *H04N 19/105* (2014.11); *H04N 19/136* (2014.11);
(Continued)

(58) Field of Classification Search
CPC ...... H04N 19/30; H04N 19/44; H04N 19/136; H04N 19/90; H04N 19/167; H04N 19/105; H04N 19/187
See application file for complete search history.

(56) References Cited

U.S. PATENT DOCUMENTS

2014/0003504 A1* 1/2014 Ugur .................... H04N 19/103
375/240.12
2015/0023407 A1* 1/2015 Sato ....................... H04N 19/44
375/240.02

FOREIGN PATENT DOCUMENTS

JP 2016531467 A 10/2016

* cited by examiner

Primary Examiner — Tracy Y. Li
(74) Attorney, Agent, or Firm — Canon U.S.A., Inc. IP Division

(57) ABSTRACT

The present invention relates to specification of a tile capable of being independently processed to process a certain area at high speed in encoding and decoding of tiles resulting from division of an image in hierarchical coding of the image. An image encoding apparatus that performs the hierarchical coding of an input image with multiple layers includes an acquiring unit and an encoding unit. The acquiring unit acquires a first image generated from the input image and a second image having resolution different from that of the first image. In the encoding of a first area in the first image acquired by the acquiring unit, the encoding unit performs the encoding using a second area existing at the relatively same position as that of the first area in the first image in the second image as a reference image.

16 Claims, 16 Drawing Sheets

(51) Int. Cl.
*H04N 19/187* (2014.01)
*H04N 19/167* (2014.01)
*H04N 19/136* (2014.01)
*H04N 19/44* (2014.01)
*H04N 19/90* (2014.01)

(52) U.S. Cl.
CPC ......... *H04N 19/167* (2014.11); *H04N 19/187* (2014.11); *H04N 19/44* (2014.11); *H04N 19/90* (2014.11)

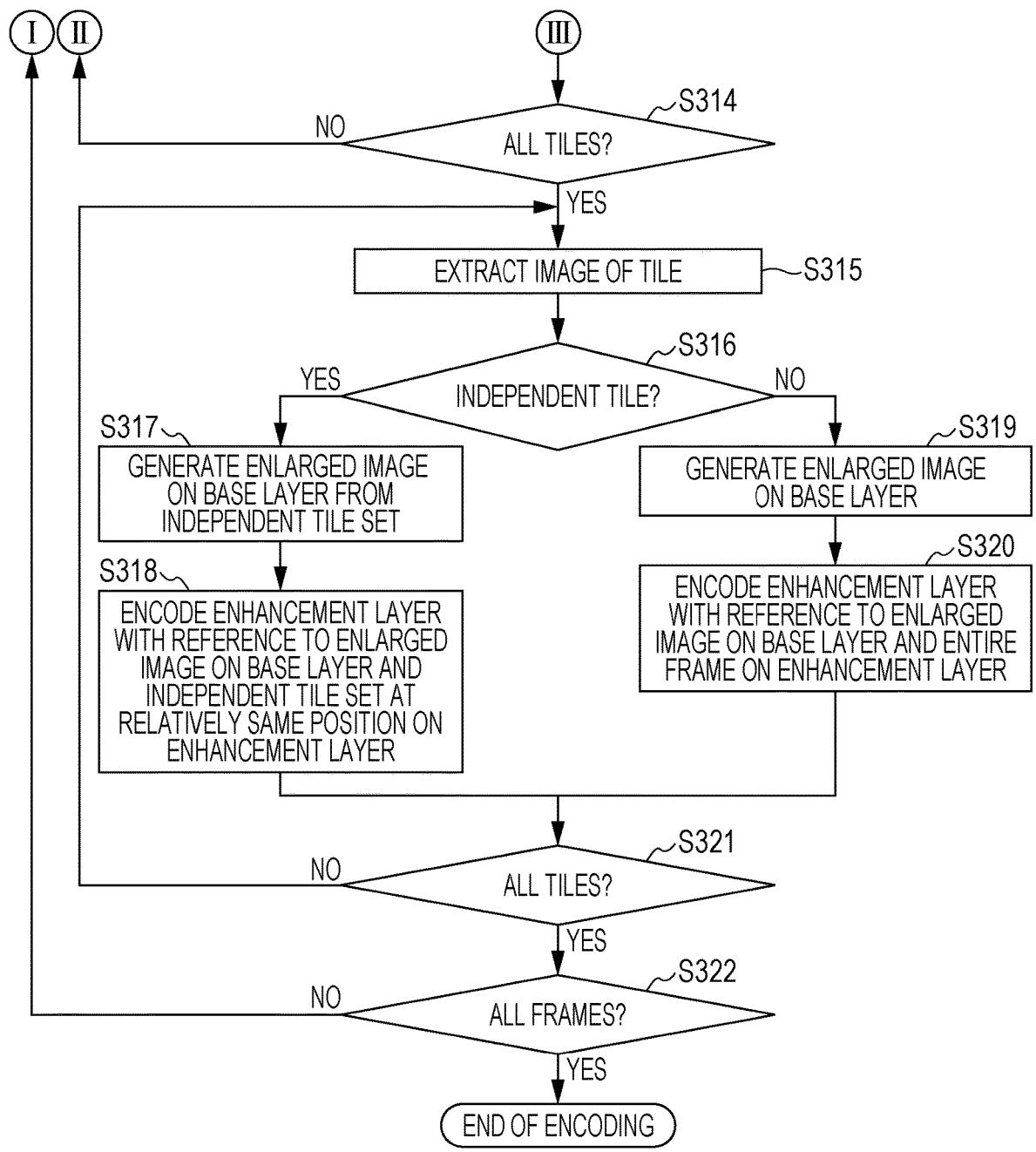

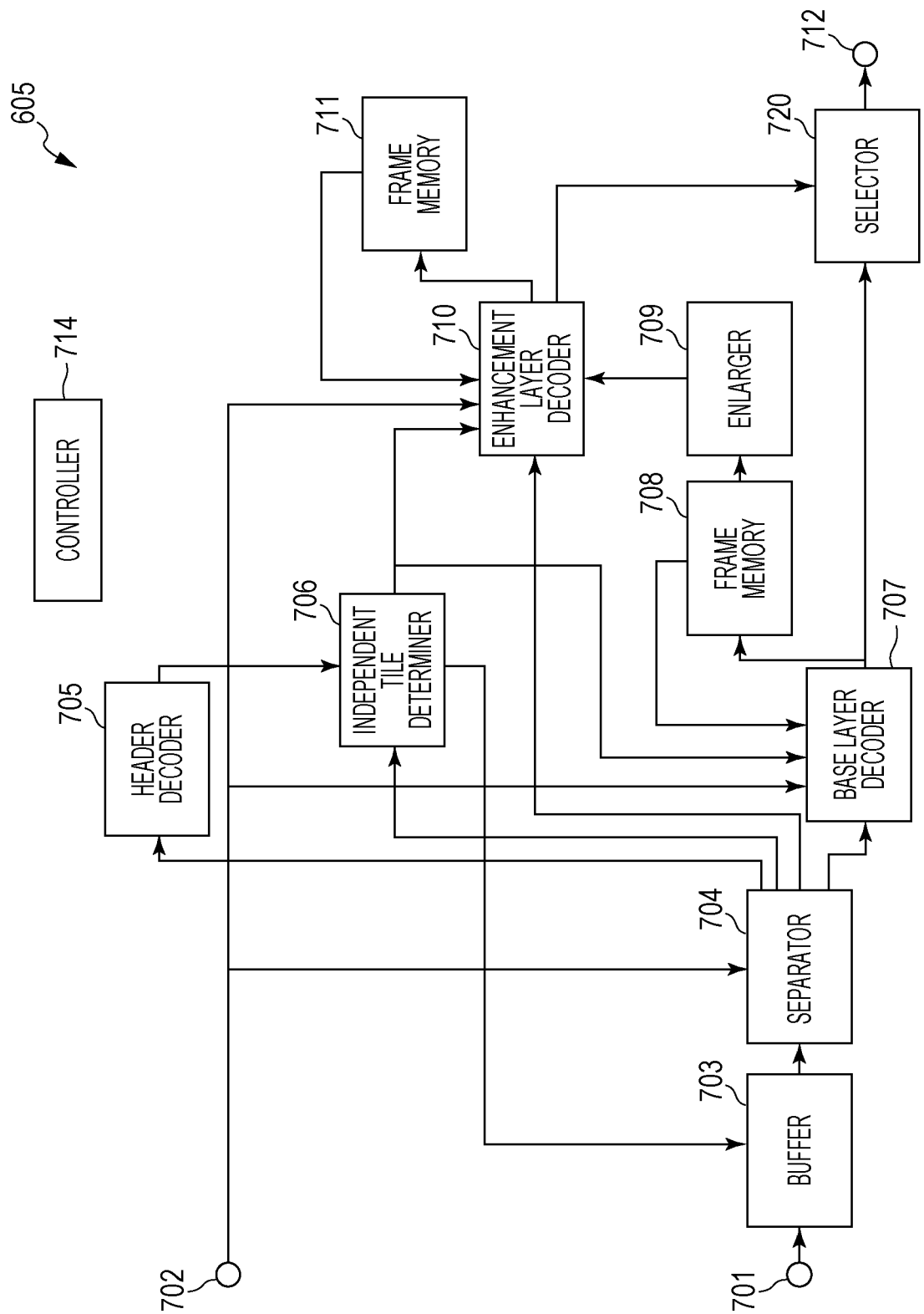

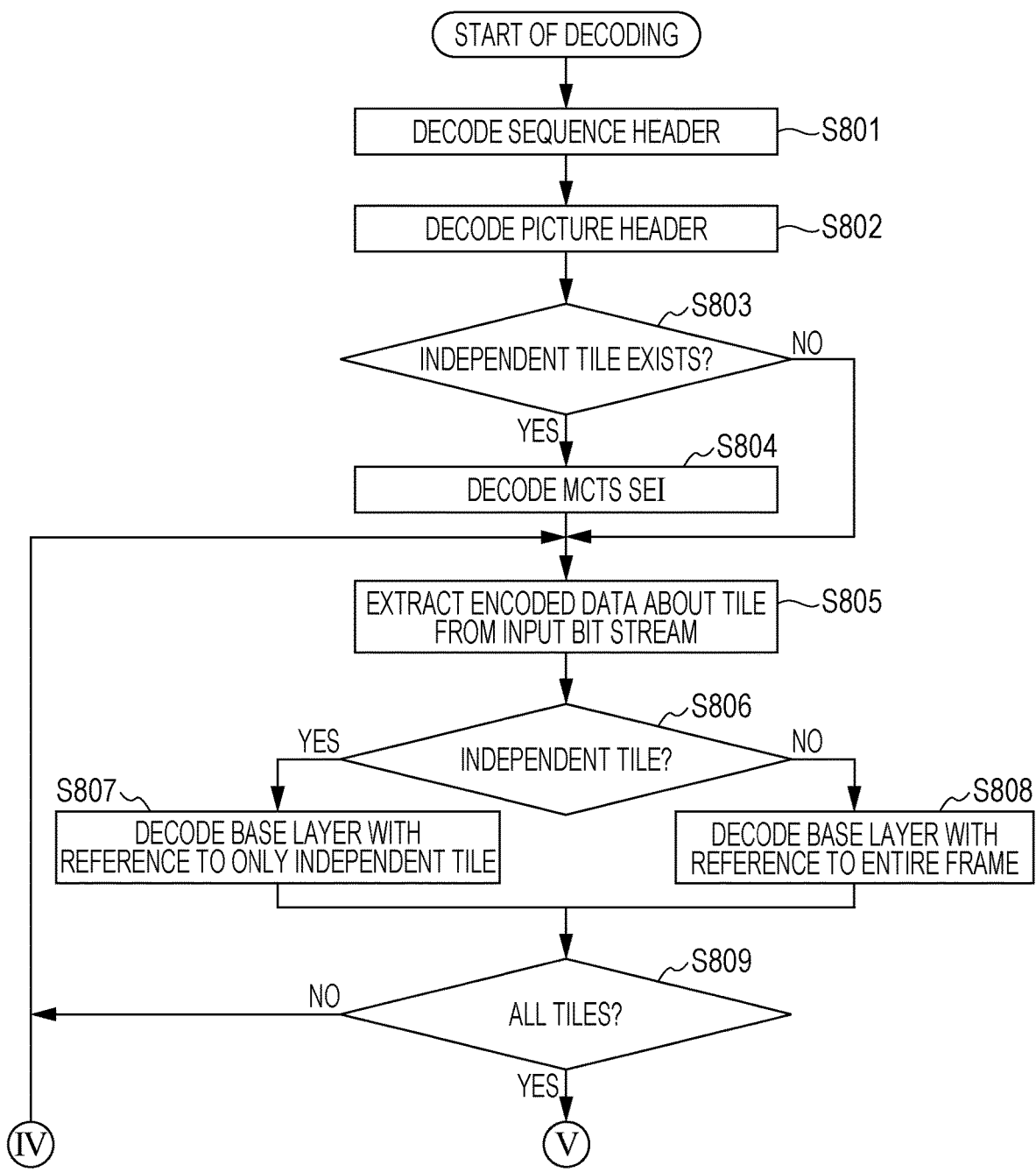

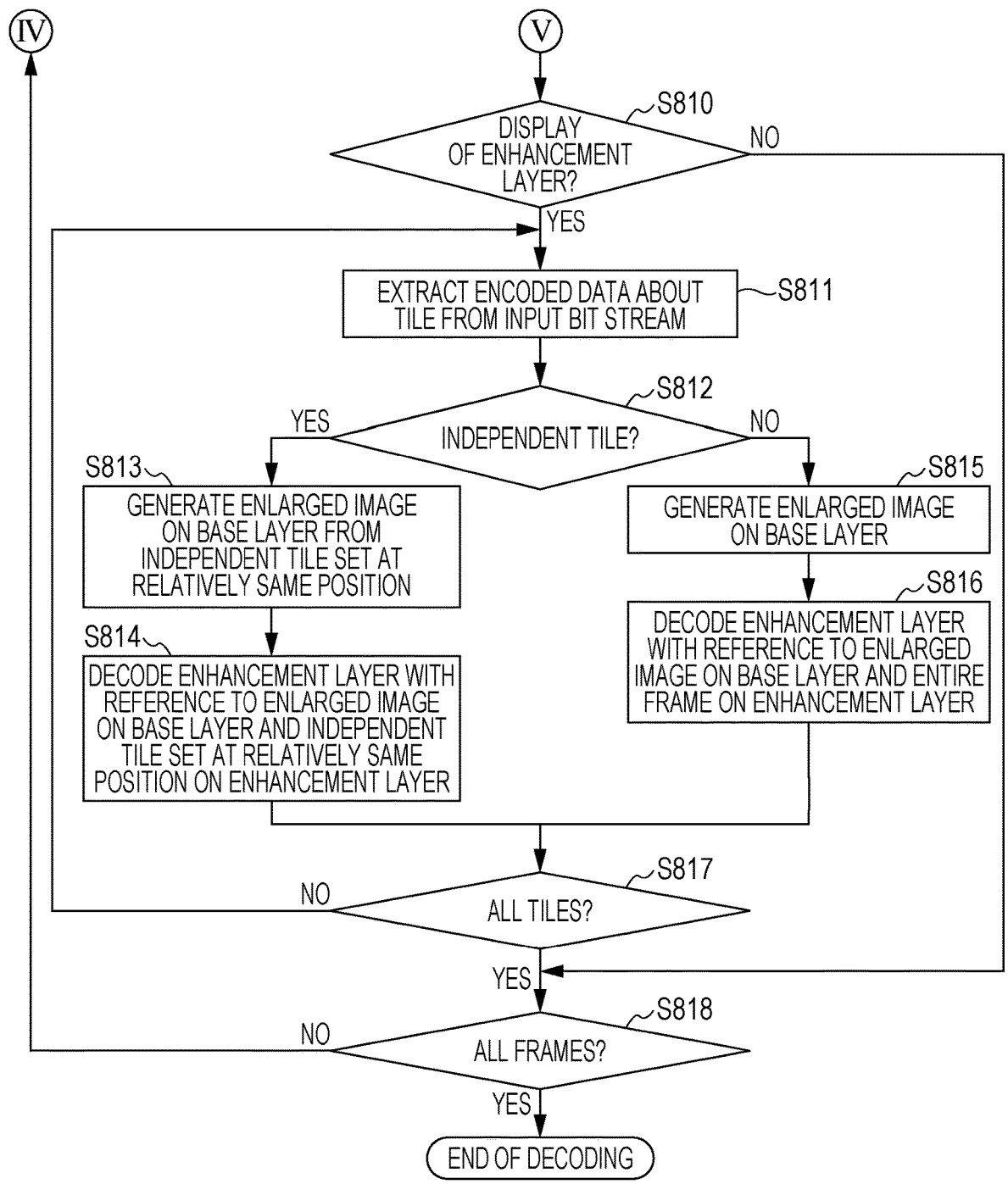

FIG. 12

| vui_parameters() { | Descriptor |
|---|---|
| aspect_ratio_info_present_flag | u(1) |
| if(aspect_ratio_info_present_flag) { | |
| aspect_ratio_idc | u(8) |
| ... | |
| } | |
| ... | |
| bitstream_restriction_flag | |
| if(bitstream_restriction_flag) { | |
| tiles_fixed_structure_flag | u(1) |
| motion_constrained_tile_sets_flag | u(1) |
| if(! motion_constrained_tile_sets_flag) ( | |
| tile_boundaries_aligned_flag | u(1) |
| }else{ | |
| tile_boundaries_aligned_flag = 1 | u(1) |
| } | |
| } | |

IMAGE ENCODING APPARATUS, IMAGE ENCODING METHOD, RECORDING MEDIUM AND PROGRAM, IMAGE DECODING APPARATUS, IMAGE DECODING METHOD, AND RECORDING MEDIUM AND PROGRAM

CROSS-REFERENCE TO RELATED APPLICATIONS

This application is a continuation of U.S. patent application Ser. No. 14/904,404, filed on Jan. 11, 2016, that is a national phase application of international patent application PCT/JP2014/003506, filed on Jul. 1, 2014, and claims the benefit of, and priority to, Japanese Patent Application No. 2013-146305, filed Jul. 12, 2013 which applications are hereby incorporated by reference herein in their entireties.

TECHNICAL FIELD

The present invention relates to encoding and decoding of layers of different spatial resolutions or different image qualities. In particular, the present invention relates to an image encoding and decoding technology to divide each image composing a moving image into multiple areas to perform the encoding and decoding for each divided area.

BACKGROUND ART

H. 264/Moving Picture Experts Group (MPEG)-4 Advanced Video Coding (AVC) (hereinafter referred to as H. 264) is known as an encoding method for compression recording of a moving image.

In recent years, an activity of international standardization of a higher-efficiency encoding method is started as a successor of H. 264 and Joint Collaborative Team on Video Coding (JCT-VC) is established between International Organization for Standardization/International Electrotechnical Commission (ISO/IEC) and International Telecommunication Union Telecommunication Standardization Sector (ITU-T). In JCT-VC, standardization of High Efficiency Video Coding (hereinafter referred to as HEVC) is underway (refer to NPL 1).

In HEVC, a technology called a tile division method is adopted in which an image is divided into rectangular areas (tiles) to independently perform encoding and decoding of the individual areas. In addition, in the tile division method, a technique to perform the encoding and decoding of motion constrained tile sets (hereinafter referred to as MCTS) each composed of one or more tiles independently of the other tiles is proposed (refer to NPL 2). In the proposal described in NPL 2, the MCTS that is capable of being set for each sequence is defined. In other words, the MCTS is arranged at the relatively same position in each frame in the same sequence. In the above proposal, in the encoding and decoding of the MCTS in a frame to be processed, a pixel group arranged at the relatively same position as that of the MCTS in another frame is subjected to inter-frame prediction. In other words, the pixels other than the pixels in the pixel group are not used as reference pixels that are referred to in motion vector search. This allows the independence of the encoding and decoding in the MCTS to be ensured. The position of each tile included in the MCTS in an image is included in a supplemental enhancement information (SEI) message for encoding.

In the standardization of the HEVC, extension to hierarchical coding is also considered. In the hierarchical coding, a tile to be encoded is encoded on a base layer and an enhancement layer. The tiles encoded in the respective layers are multiplexed to generate a bit stream. In the hierarchical coding described above, it is possible to independently set the boundary position of the tile on the base layer and the boundary position of the tile on the enhancement layer. Since it is necessary to refer to a tile to be encoded on the base layer in the encoding of the corresponding tile on the enhancement layer, it is necessary to identify the position of the tile on the base layer. Accordingly, use of tile_boundaries_aligned_flag as a Video Usability Information (VUI) parameter (vui_parameters) on the enhancement layer is proposed (refer to NPL 3). The tile_boundaries_aligned_flag results from encoding of coincidence information indicating whether the tile is arranged at the relatively same position in the respective layers. If the tile_boundaries_aligned_flag has a value of one, it is ensured that the boundary position of the tile on the enhancement layer coincides with the boundary position of the corresponding tile on the base layer. Since this allows the position of the tile on the base layer, which is called in the encoding and decoding of the tile on the enhancement layer, to be identified, it is possible to independently encode and decode the tile on the enhancement layer to enable high-speed encoding and decoding. The base layer is the highest-level layer and the succeeding enhancement layers are the lower-level layers.

However, in the MCTS described in NPL 2, the hierarchical coding is not considered. Specifically, when the boundary of the tile and the position of the MCTS are capable of being set for each layer, the relative positions of the tile on the respective layers may not coincide with each other. For example, when a certain tile on the enhancement layer is included in the MCTS and the tile at the position corresponding to the certain tile on the base layer is not included in the MCTS, it is necessary to also decode surrounding tiles, in addition to the tile at the position corresponding to the certain tile, on the base layer.

This will now be specifically described with reference to FIG. 13. FIG. 13 illustrates how to divide a frame into tiles. Referring to FIG. 13, reference numerals 1301 to 1310 each denote a frame. Each of the frames 1301 to 1310 includes 12 tiles of tile numbers 0 to 11. The tile of the tile number one is hereinafter referred to as a tile 1. The same applies to the other tile numbers. For description, on the base layer, each frame is horizontally divided into two tiles and is not vertically divided. On the enhancement layer, each frame is horizontally divided into four tiles and vertically divided into three tiles. Thin-line boxes represent the boundaries of the tiles in FIG. 13.

Each of the frames 1301, 1303, 1305, 1307, and 1309 indicates the frame of each layer at a time t. The frame 1301 indicates the frame on the base layer at the time t. The frame 1305 indicates the frame on an enhancement first layer (a first enhancement layer) at the time t. The frame 1303 indicates the frame resulting from enlargement of a reconstructed image resulting from local decoding of the frame 1301 to the resolution of the first enhancement layer. The frame 1309 indicates the frame on an enhancement second layer (a second enhancement layer) at the time t. The frame 1307 indicates the frame resulting from enlargement of a decoded image of the frame 1305 to the resolution of the second enhancement layer.

Each of the frames 1302, 1304, 1306, 1308, and 1310 indicates the frame of each layer at a time t+delta. The frame 1302 indicates the frame on the base layer at the time t+delta. The frame 1306 indicates the frame on the first enhancement layer at the time t+delta. The frame 1304 indicates the frame resulting from enlargement of the decoded image of the frame 1302 to the resolution of the first enhancement layer. The frame 1310 indicates the frame on the second enhancement layer at the time t+delta. The frame 1308 indicates the frame resulting from enlargement of the decoded image of the frame 1306 to the resolution of the second enhancement layer.

The tile 5 on each of the frames (the frames 1305, 1306, 1309, and 1310) on the enhancement layer is described as a tile in the MCTS here. Referring to FIG. 13, each bold-line box indicates the tile belonging to the MCTS or the position corresponding to the tile.

Referring to FIG. 13, the tile 5 in the frame 1306 on the first enhancement layer is required to be decoded in order to decode the MCTS (the tile 5) in the frame 1310 on the second enhancement layer. In addition, the tile 0 in the frame 1302 on the base layer is required to be decoded in order to decode the tile 5 in the frame 1306 on the first enhancement layer. Furthermore, the inter-frame prediction is required to be performed with reference to the frame 1301 and all the tiles in the frame 1301 are required to be decoded in order to decode the tile 0 in the frame 1302 on the base layer.

In other words, in related art, in the decoding of the MCTS on the second enhancement layer at the time t+delta, it is necessary to decode an area other than the area indicating the position of the tile 5 in the frame 1302 on the base layer at the time t+delta (the area denoted by broken lines in the frame 1304). Accordingly, in the encoding and decoding of a certain tile using the MCTS or the like in the hierarchical coding, there is a problem in that it is not possible to independently encode and decode only the tiles corresponding to the position of the MCTS.

CITATION LIST

Non Patent Literature

[NPL 1]
ITU-T H. 265 (April, 2013) High efficiency video coding
[NPL 2]
JCT-VC contributed article JCTVC-M0235 Internet <http://phenix.int-evry.fr/jct/doc_end_user/docments/13_Incheon/wg11/>
[NPL 3]
JCT-VC contributed article JCTVC-M0202 Internet <http://phenix.int-evry.fr/jct/doc_end_user/documents/13_Incheon/wg11/>

SUMMARY OF INVENTION

The present invention provides a technology to encode and decode a certain tile set as the MCTS independently of the other tiles in the hierarchical coding. The tile capable of being independently encoded and decoded, like each tile included in the MCTS, is hereinafter referred to as an independent tile. A collection of the independent tiles, like the MCTS, is hereinafter referred to as an independent tile set.

The present invention provides an image encoding apparatus that performs hierarchical coding of images composing a moving image with a plurality of layers. The image encoding apparatus includes a first generating unit, an encoding unit, a first acquiring unit, and a setting unit. The first generating unit generates a first image and a second image of different layers from the images. The encoding unit encodes at least either of the first image and the second image. The first acquiring unit acquires information indicating whether a first area capable of being encoded without reference to another area in the first image exists in the first image. The setting unit sets a second area at a position corresponding to the first area in the first image in the second image if the first area exists in the first image on the basis of the information acquired by the first acquiring unit.

The present invention provides an image decoding apparatus that decodes encoded data resulting from hierarchical coding of images composing a moving image with a plurality of layers. The image decoding apparatus includes a first acquiring unit, a second acquiring unit, and a decoding unit. The first acquiring unit acquires first data corresponding to a first image and second data corresponding to a second image of a layer different from that of the first image, the first data and the second data being generated from the encoded data. The second acquiring unit acquires information indicating whether a first area capable of being decoded without reference to another area in the first image exists in the first image. The decoding unit decodes the first area in the first image using a second area existing at a position corresponding to the first area in the first image in the second image if the first area exists in the first image on the basis of the information acquired by the second acquiring unit.

Further features of the present invention will become apparent from the following description of exemplary embodiments with reference to the attached drawings.

According to the present invention, it is possible to set a tile capable of independently being encoded and decoded in the hierarchical coding.

BRIEF DESCRIPTION OF DRAWINGS

FIG. 3B is a flowchart illustrating the exemplary image encoding process in the image encoding apparatus of the first embodiment.

FIG. 7 is a block diagram illustrating an example of the configuration of an image decoding unit in the second embodiment.

FIG. 8A is a flowchart illustrating an exemplary image decoding process in the image decoding unit illustrated in FIG. 7.

FIG. 8B is a flowchart illustrating the exemplary image decoding process in the image decoding unit illustrated in FIG. 7.

FIG. 12 illustrates an example of the syntax of vui_parameters of a bit stream.

DESCRIPTION OF EMBODIMENTS

Embodiments will herein be described in detail with reference to the attached drawings. Configurations described in the embodiments are only examples and the present invention is not limited to the configurations described below.

First Embodiment

Figure 1:
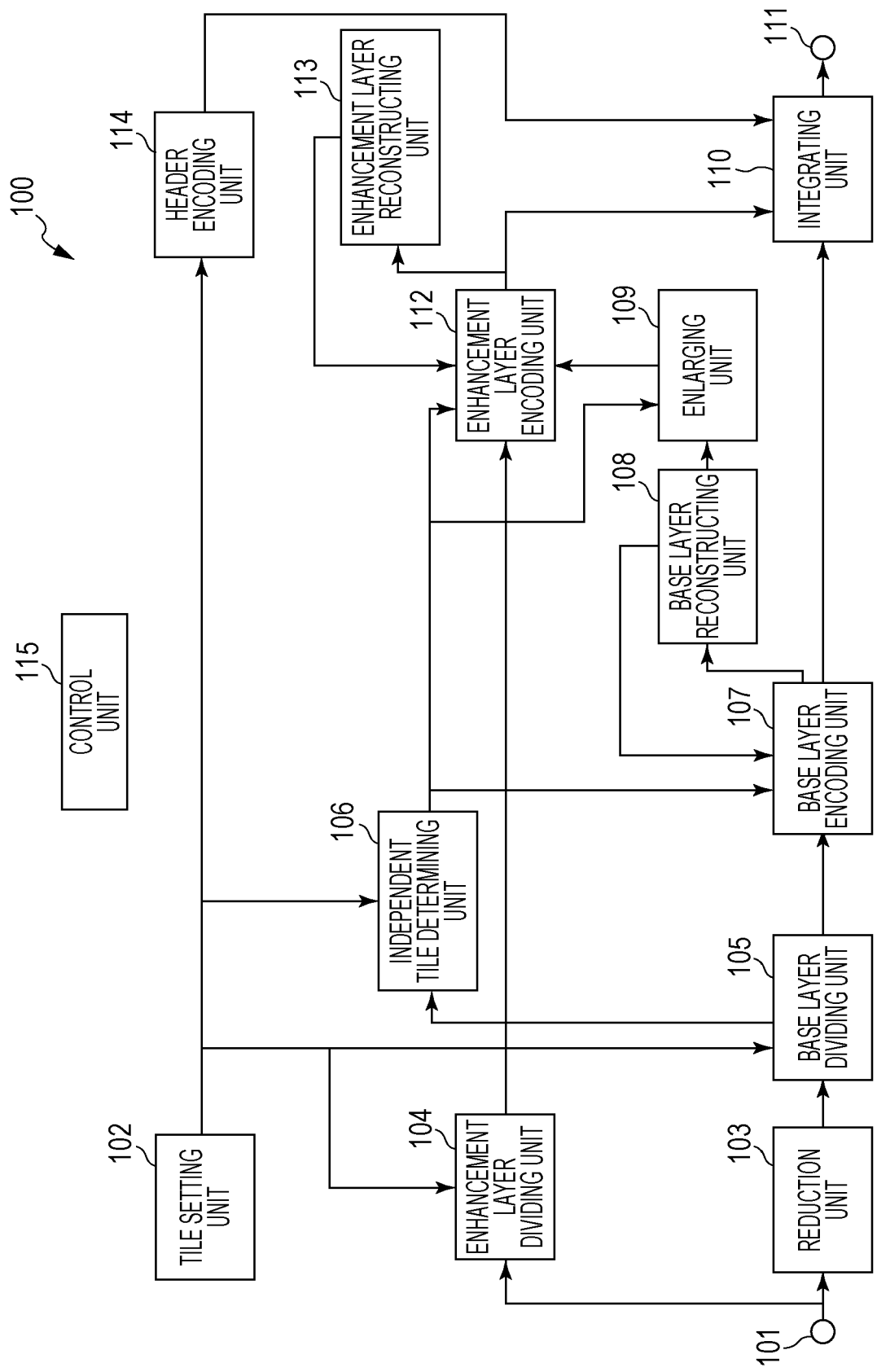
FIG. 1 is a block diagram illustrating an example of the configuration of an image encoding apparatus according to a first embodiment.

An outline of each processing unit composing an image encoding apparatus according to a first embodiment will now be described with reference to FIG. 1. FIG. 1 is a block diagram illustrating an example of the configuration of an image encoding apparatus 100 of the first embodiment.

Referring to FIG. 1, an image (an input image) is input into the image encoding apparatus 100 through a terminal 101 (an input unit). The input image is input for each frame. A tile setting unit 102 determines the number of tiles horizontally divided in one frame, the number of tiles vertically divided in one frame, and the position of each tile. In addition, the tile setting unit 102 determines which tile, among the tiles resulting from the division, is encoded as the independent tile. Information indicating the number of tiles horizontally divided, the number of tiles vertically divided, and the position of each tile, which are set by the tile setting unit 102, is hereinafter referred to as tile division information. Since the tile division information is described in a portion in which Picture Parameter Set (PPS), which header data about each picture, is described in NPL 1, a description of the tile division information is omitted herein.

Figure 2:
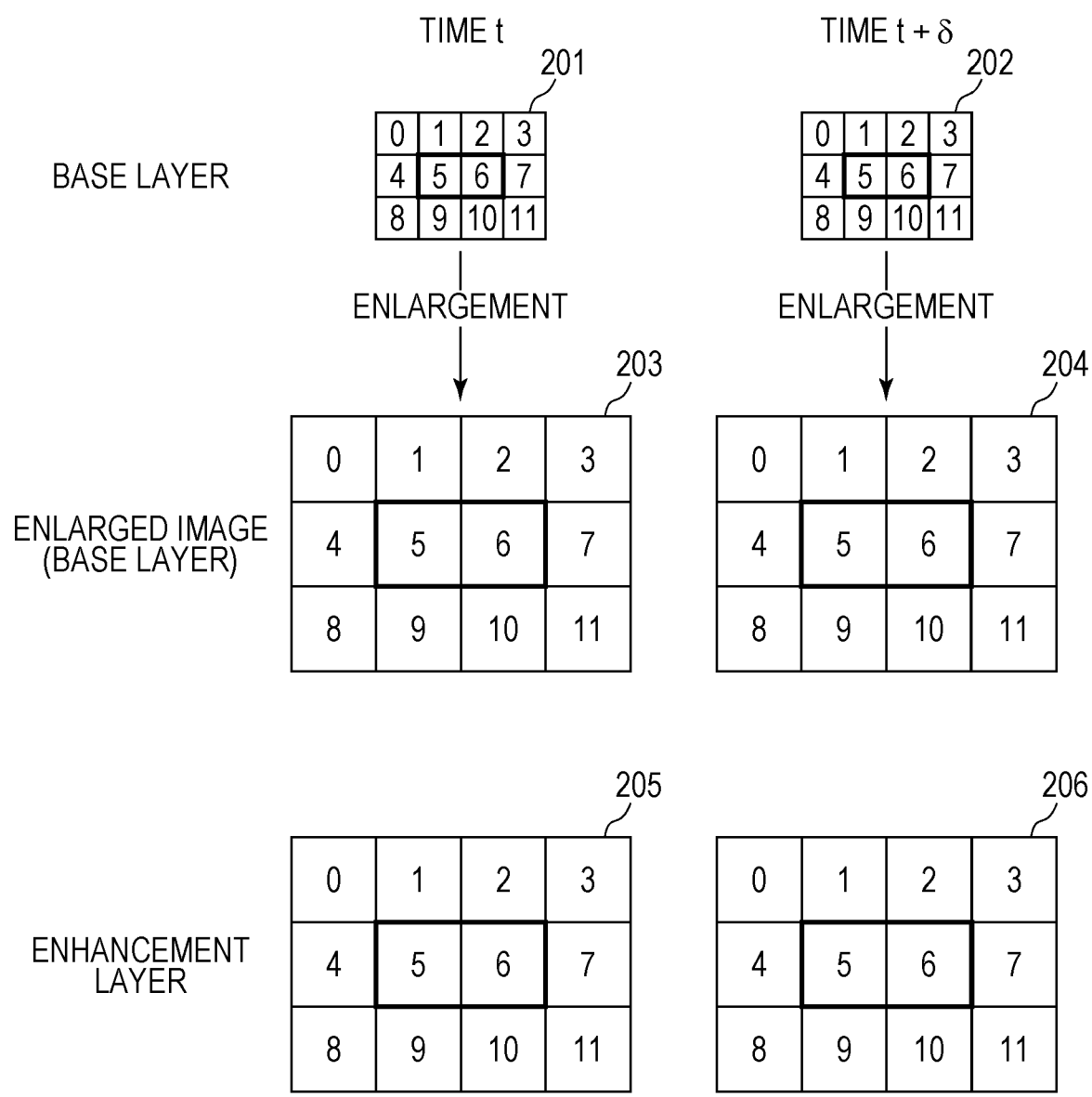
FIG. 2 illustrates an exemplary tile structure.

FIG. 2 illustrates an example of how to divide a frame into tiles in the first embodiment. In the example in FIG. 2 of the first embodiment, one frame is 4K2K (4,096 horizontal pixels×2,160 vertical pixels). The 4,096 horizontal pixels× 2,160 vertical pixels are hereinafter denoted by 4,096×2,160 pixels in the first embodiment. The same applies to different numbers of pixels. Referring to FIG. 2, reference numerals 201 to 206 denote frames. Each of the frames 201 to 206 is horizontally divided into four and vertically divided into three to be composed of 12 tiles of tile numbers 0 to 11. In other words, the size of one tile is 1,024×720 pixels. However, the number of tiles resulting from the division is not limited to this numbers. The tile 5 and the tile 6 surrounded by bold-line boxes in the frames 201 to 206 in FIG. 2 are the independent tiles and an area composed of the tiles 5 and 6 corresponds to the independent tile set. Thin-line boxes in the frames 201 to 206 in FIG. 2 represent the boundaries of the tiles. The bold-line boxes in enlarged images in FIG. 2 represent the position corresponding to the independent tile set. As apparent from FIG. 2, the number of tiles horizontally divided, the number of tiles vertically divided, and the relative position of each tile are common to the respective layers.

Referring to FIG. 2, the frame 201 indicates the frame on the base layer input at a time t. The frame 202 indicates the frame on the base layer input at a time t+delta. The frame 201 has been subjected to encoding and local decoding (dequantization and inverse transformation) at the time t+delta and the frame 201 subjected to the local decoding may be used as a reference frame in the encoding of the frame 202.

The frame 203 represents the enlarged image resulting from generation of a reconstructed image by the local decoding after the encoding of the frame 201 and enlargement of the reconstructed image to the size equal to that on the enhancement layer. The frame 204 represents the enlarged image resulting from generation of the reconstructed image by the local decoding after the encoding of the frame 202 and enlargement of the reconstructed image to the size equal to that on the enhancement layer.

The frame 205 indicates the frame on the enhancement layer input at the time t. The frame 206 indicates the frame on the enhancement layer input at the time t+delta.

The description of each processing unit in FIG. 1 is continued. Each frame at the time t+delta is described as a frame to be encoded.

The tile setting unit 102 generates an independent tile flag representing information indicating whether each sequence includes the independent tile. The tile setting unit 102 sets the value of the independent tile flag to one if the independent tile is included in the frame to be encoded and sets the value of the independent tile flag to zero if no independent tile is included in the frame to be encoded. When the independent tile is included in the frame to be encoded (the value of the independent tile flag is one), the tile setting unit 102 generates independent tile position information indicating the position of the independent tile. Although the independent tile position information is generally represented by the tile number in the image, the present invention is not limited to this. The tile setting unit 102 supplies the independent tile flag and the independent tile position information that are generated to the downstream units as the tile division information. In the first embodiment, the tile division information output from the tile setting unit 102 is supplied to an enhancement layer dividing unit 104, a base layer dividing unit 105, an independent tile determining unit 106, and a header encoding unit 114.

A reduction unit 103 reduces the size of the input image supplied from the terminal 101 using a predetermined filter, etc. to generate a reduced image (a base layer image) having reduced resolution.

The enhancement layer dividing unit 104 uses the input image supplied from the terminal 101 as an enhancement layer image to divide the enhancement layer image into one or more tiles on the basis of the tile division information supplied from the tile setting unit 102. In the example in FIG. 2, the enhancement layer dividing unit 104 divides the frame 206 that is input into the 12 tiles: the tiles 0 to 11. In addition, the enhancement layer dividing unit 104 supplies the tiles resulting from the division to the downstream units in the order of the tile numbers (0, 1, 2, . . . 11).

The header encoding unit 114 generates header encoded data for each sequence and for each picture. In particular, the header encoding unit 114 receives the independent tile flag and the independent tile position information generated in the tile setting unit 102, generates MCTS SEI (an SEI message), and encodes the VUI parameter (the vui_parameters).

The base layer dividing unit 105 divides the base layer image generated by the reduction unit 103 into one or more tiles on the basis of the tile division information supplied from the tile setting unit 102. Specifically, the base layer dividing unit 105 divides the base layer image into the tiles so that the position of each tile based on the tile division information is the relatively same position in the base layer image generated by the reduction unit 103. In the first embodiment, the base layer dividing unit 105 divides the frame 202 that is input into the 12 tiles: the tiles 0 to 11, as illustrated in FIG. 2. The base layer dividing unit 105 supplies the tiles resulting from the division to the downstream units in the order of the tile numbers. The base layer dividing unit 105 supplies the numbers of the tiles to be output (the tiles to be encoded) to the independent tile determining unit 106.

The independent tile determining unit 106 determines whether the tile to be encoded (encoding target tile) is the independent tile. The independent tile determining unit 106 determines whether the encoding target tile is the independent tile on the basis of the independent tile flag and the independent tile position information generated by the tile setting unit 102 and the number of the encoding target tile supplied from the base layer dividing unit 105. If the independent tile flag is set to one, the independent tile position information indicates that the position of the independent tile is the tile 5, and the encoding target tile is the tile 5, the independent tile determining unit 106 determines that the encoding target tile is the independent tile. The independent tile determining unit 106 supplies the result of the determination to the downstream units as an independent tile encoding flag. The independent tile determining unit 106 sets the value of the independent tile encoding flag to one if the encoding target tile is the independent tile and sets the value of the independent tile encoding flag to zero if the encoding target tile is not the independent tile.

A base layer encoding unit 107 encodes the image of the encoding target tile in the base layer image supplied from the base layer dividing unit 105. The base layer encoding unit 107 encodes the encoding target tile on the basis of the independent tile encoding flag supplied from the independent tile determining unit 106 to generate base layer encoded data.

When the independent tile encoding flag indicates that the encoding target tile is the independent tile, the base layer encoding unit 107 performs the encoding in the following manner. The base layer encoding unit 107 performs prediction and encoding with reference only to the pixels at the relatively same position as that of the independent tile set including the encoding target tile, in the reconstructed image on the base layer subjected to the local decoding. In the example in FIG. 2, when the tile 5 in the frame 202 is the encoding target tile, the base layer encoding unit 107 performs the prediction and the encoding with reference only to the tile 5 and the tile 6 in the independent tile set in the frame 201. In contrast, when the independent tile encoding flag indicates that the encoding target tile is not the independent tile, the base layer encoding unit 107 performs the prediction and the encoding of a prediction error and so on with reference to all the pixels in the reconstructed image on the base layer subjected to the local decoding. In the example in FIG. 2, when the tile 2 in the frame 202 is to be encoded, the base layer encoding unit 107 performs the prediction and the encoding with reference to all the tiles (the tiles 0 to 11) in the frame 201.

The base layer encoding unit 107 supplies a prediction mode used for the prediction, the prediction error generated in the prediction, the base layer encoded data generated by encoding the prediction error, and so on to the downstream units.

A base layer reconstructing unit 108 receives coefficients (the prediction mode and the prediction error) generated by the base layer encoding unit 107 and performs the local decoding of the prediction error to generate the reconstructed image on the base layer. The base layer reconstructing unit 108 holds the generated reconstructed image. This is because the reconstructed image is used for the prediction in the base layer encoding unit 107 and an enhancement layer encoding unit 112.

An enlarging unit 109 enlarges the reconstructed image on the base layer to the size on the enhancement layer. In the example in FIG. 2, the enlarging unit 109 enlarges the reconstructed image of each of the frame 201 and the frame 202 to generate the frame 203 and the frame 204, respectively.

The enhancement layer encoding unit 112 encodes the image of the tile supplied from the enhancement layer dividing unit 104. Specifically, the enhancement layer encoding unit 112 selects a reference image on the basis of the independent tile encoding flag supplied from the independent tile determining unit 106 and encodes the encoding target tile to generate enhancement layer encoded data.

If the independent tile encoding flag is set to one (if the encoding target tile is the independent tile), the enhancement layer encoding unit 112 refers to the enlarged image resulting from enlargement of the reconstructed image on the base layer subjected to the local decoding and the reconstructed image on the enhancement layer subjected to the local decoding. The enhancement layer encoding unit 112 performs the prediction and the encoding with reference to the image included in the independent tile set of each of the enlarged image and the reconstructed image. In the example in FIG. 2, when the tile 5 in the frame 206 is to be encoded, the enhancement layer encoding unit 112 performs the prediction and the encoding with reference to the tile 5 and the tile 6 in the frame 204 and the reconstructed image subjected to the local decoding in the tile 5 in the frame 206. If the independent tile encoding flag is set to zero (if the encoding target tile is not the independent tile), the enhancement layer encoding unit 112 performs the prediction without limitation to the independent tile with reference to the enlarged image on the base layer subjected to the local decoding and the reconstructed image on the enhancement layer subjected to the local decoding. The enhancement layer encoding unit 112 encodes the prediction error, etc. generated in the prediction.

The enhancement layer encoding unit 112 supplies the prediction mode used for the prediction, the prediction error generated in the prediction, the enhancement layer encoded data generated by encoding the prediction error, and so on to the downstream units, as in the base layer encoding unit 107.

An enhancement layer reconstructing unit 113 performs the local decoding using, for example, the coefficients (the prediction mode and the prediction error) generated by the enhancement layer encoding unit 112 during the encoding to generate the reconstructed image on the enhancement layer. The enhancement layer reconstructing unit 113 holds the generated reconstructed image because the reconstructed image is used in the encoding in the enhancement layer encoding unit 112.

An integrating unit 110 integrates the base layer encoded data generated by the base layer encoding unit 107, the enhancement layer encoded data generated by the enhancement layer encoding unit 112, and the header encoded data generated by the header encoding unit 114 with each other to generate a bit stream. The bit stream generated by the integrating unit 110 is output from a terminal 111.

A control unit 115 controls the processing units in the image encoding apparatus and transfers the parameter between the processing units. Connection lines between the control unit 115 and the processing units in the image encoding apparatus are omitted in FIG. 1. The control unit 115 is capable of controlling the processing units in the image encoding apparatus and reading and writing the parameter between the processing units via a parameter signal line or a register bus. Although the control unit 115 in FIG. 1 is provided in the image encoding apparatus in the first embodiment, the present invention is not limited to this. Specifically, the control unit 115 may be provided outside the image encoding apparatus to control the processing units in the image encoding apparatus and read and write the parameter between the processing units via the parameter signal line or the register bus.

An exemplary encoding process of an image in the image encoding apparatus 100 described above will now be described with reference to flowcharts in FIGS. 3A and 3B.

Figure 3A:
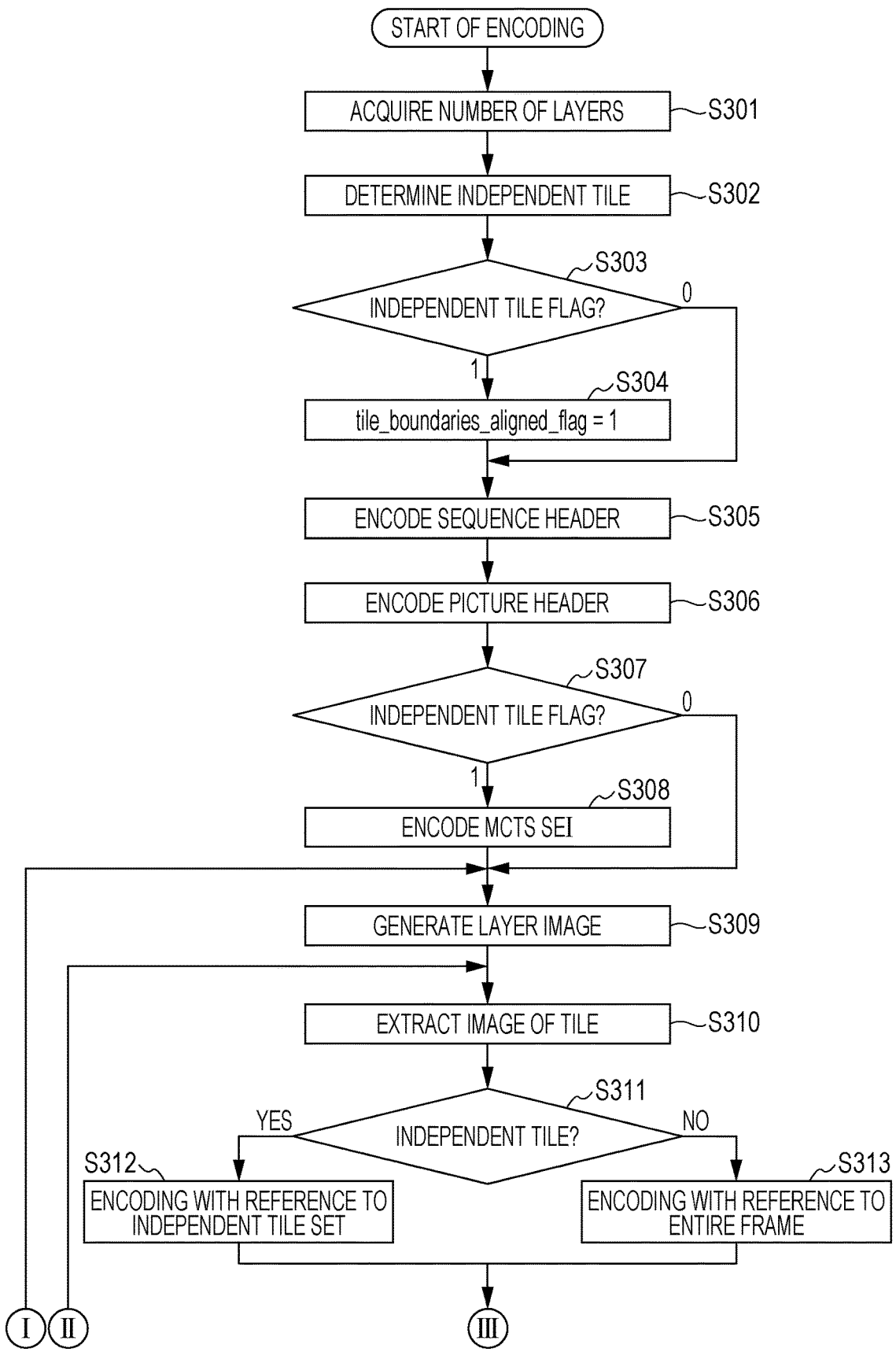
FIG. 3A is a flowchart illustrating an exemplary image encoding process in the image encoding apparatus of the first embodiment.

Referring to FIGS. 3A and 3B, in Step S301, the image encoding apparatus 100 acquires the number of layers in the hierarchical coding, which is specified by a user. It is assumed in the first embodiment that one enhancement layer is used and the hierarchical coding of the two layers (the base layer and one enhancement layer) is performed.

In Step S302, the tile setting unit 102 determines the number of divided tiles in the frame to be encoded and the positions of the division and also determines which tile in the frame to be encoded is set as the independent tile. It is assumed in the first embodiment that the tile 5 and the tile 6 are the independent tiles and the tile 5 and the tile 6 compose one independent tile set. Accordingly, the tile setting unit 102 sets the independent tile flag to one in the first embodiment. If the independent tile is not included in the frame to be encoded, the tile setting unit 102 sets the independent tile flag to zero. The tile setting unit 102 supplies the independent tile flag that is determined to the enhancement layer dividing unit 104, the base layer dividing unit 105, the independent tile determining unit 106, and the header encoding unit 114.

In Step S303, the header encoding unit 114 determines the independent tile flag supplied from the tile setting unit 102. If the header encoding unit 114 determines that the independent tile flag is set to one, the process goes to Step S304. If the header encoding unit 114 determines that the independent tile flag is set to zero, the process goes to Step S305.

In Step S304, the header encoding unit 114 sets the tile_boundaries_aligned_flag of the vui_parameters, which represents the coincidence information about the position of each tile, to one. The tile_boundaries_aligned_flag of the vui_parameters results from encoding of the coincidence information indicating whether the tile is arranged at the relatively same position on the respective layers.

In Step S305, the header encoding unit 114 encodes video_parameter_set, which is a sequence header. The video_parameter_set includes vps_max_layers_minus1 indicating the number of layers in the hierarchical coding. The vps_max_layers_minus1 is set to one in the first embodiment. Then, the header encoding unit 114 encodes Sequence parameter set (described in 7.3.2.2 in NPL 1). The Sequence parameter set also includes the vui_parameters. The vui_parameters includes the tile_boundaries_aligned_flag set in Step S304. The integrating unit 110 receives the encoded data (the video_parameter_set and the Sequence parameter set) to generate the bit stream. The integrating unit 110 outputs the generated bit stream to the outside of the image encoding apparatus 100 via the terminal 111.

In Step S306, the header encoding unit 114 encodes the Picture Parameter Set (described in 7.4.3.3 in NPL 1), which is a picture header. The integrating unit 110 receives the encoded data about the pitcher header (the Picture Parameter Set) to generate the bit stream. The integrating unit 110 outputs the generated bit stream to the outside of the image encoding apparatus 100 via the terminal 111.

In Step S307, the header encoding unit 114 determines the independent tile flag supplied from the tile setting unit 102. If the header encoding unit 114 determines that the independent tile flag is set to one, the process goes to Step S308. If the header encoding unit 114 determines that the independent tile flag is set to zero, the process goes to Step S309.

In Step S308, the header encoding unit 114 encodes the MCTS SEI because the sequence to be encoded includes the independent tile. The MCTS SEI is described in Chapter 2 in NPL 2. In the first embodiment, since one independent tile set is included in one frame, num_sets_in_message_minus1 is set to zero. The value of mcts_id is set to zero. The value of num_tile_rects_in_set_minus1 is set to one. The num_tile_rects_in_set_minus1 indicates the number of independent tiles belonging to the MCTS. Since the two tiles: the tile 5 and the tile 6 are included in the independent tile set as the independent tiles in the first embodiment, the value of the num_tile_rects_in_set_minus1 is set to one. Top_left_tile_index and bottom_right_tile_index indicate the positions of the independent tiles. The top_left_tile_index has a value of five and the bottom_right_tile_index has a value of six in the first embodiment. The header encoding unit 114 encodes the pieces of header information in the above manner to generate the MCTS SEI. The integrating unit 110 receives the MCTS SEI generated by the header encoding unit 114 to generate the bit stream and outputs the generated bit stream to the outside of the image encoding apparatus 100 via the terminal 111.

In Step S309, the reduction unit 103 reduces the size of the input image to generate the base layer image. Although the base layer is generated by the reduction unit 103 because the enhancement layer has one layer in the first embodiment, the present invention is not limited to this. In the case of the hierarchical coding in which two or more enhancement layers (the total number of layers is three or more) are used, multiple reduction units 103 may be provided or one reduction unit 103 may generate the images of a desired number of layers.

In Step S310, the base layer dividing unit 105 extracts the images of the tiles on the base layer to be encoded in the order of the tile numbers from the upper left corner of the image. The base layer dividing unit 105 supplies each of the extracted images of the tiles on the base layer to the base layer encoding unit 107.

In Step S311, the independent tile determining unit 106 receives the tile number of the encoding target tile from the base layer dividing unit 105. The independent tile determining unit 106 receives the independent tile position information about the encoding target tile from the tile setting unit 102. The independent tile position information indicates five and six in the first embodiment. The independent tile determining unit 106 compares the received tile number of the encoding target tile with the tile number in the independent tile position information. If the tile number of the encoding target tile coincides with the tile number in the independent tile position information (YES in Step S311), the independent tile determining unit 106 determines that the encoding target tile is the independent tile and sets the independent tile encoding flag to one. Then, the process goes to Step S312. If the tile number of the encoding target tile does not coincide with the tile number in the independent tile position information (NO in Step S311), the independent tile determining unit 106 determines that the encoding target tile is not the independent tile and sets the independent tile encoding flag to zero. Then, the process goes to Step S313.

In Step S312, the encoding target tile is the independent tile in the frame to be encoded on the base layer. Accordingly, the base layer encoding unit 107 performs the inter-frame prediction and the encoding with reference to the reconstructed image included in the independent tile set at the relatively same position as that of the encoding target tile in another frame on the base layer subjected to the local decoding. The base layer encoding unit 107 performs intra prediction and the encoding with reference to the reconstructed image subjected to the local decoding in the encoding target tile in the frame to be encoded. A case will now be described in which the tile 5 in the frame 202 in FIG. 2 is to be encoded. The base layer encoding unit 107 performs the prediction and the encoding with reference to the reconstructed images subjected to the local decoding of the tile 5 and the tile 6 in the frame 201 and the tile 5 in the frame 202, stored in the base layer reconstructing unit 108. The base layer encoding unit 107 supplies the encoded data about the encoding target tile on the base layer resulting from encoding to the integrating unit 110 as the base layer encoded data. The integrating unit 110 integrates the base layer encoded data supplied from the base layer encoding unit 107 with the other pieces of encoded data supplied from the header encoding unit 114 and the enhancement layer encoding unit 112 to generate the bit stream. The integrating unit 110 outputs the generated bit stream via the terminal 111. The base layer reconstructing unit 108 sequentially generates the reconstructed images on the base layer using, for example, the coefficients (the prediction mode and the prediction error) generated by the base layer encoding unit 107 during the encoding to hold the generated reconstructed images.

In Step S313, the encoding target tile is not the independent tile in the frame to be encoded on the base layer. Accordingly, the base layer encoding unit 107 performs the inter-frame prediction and the encoding of the encoding target tile with reference to the entire image of another frame on the base layer subjected to the local decoding. In the example in FIG. 2, in the case of the encoding of the tile 5 in the frame 202, the base layer encoding unit 107 performs the prediction and the encoding with reference to the reconstructed images subjected to the local decoding of all the tiles in the frame 201 and the tile 5 in the frame 202, stored in the base layer reconstructing unit 108. The base layer encoding unit 107 supplies the generated base layer encoded data to the integrating unit 110. The integrating unit 110 integrates the base layer encoded data with the other pieces of encoded data to generate the bit stream and outputs the generated bit stream via the terminal 111, as in Step S312. The base layer reconstructing unit 108 sequentially generates the reconstructed images on the base layer using, for example, the coefficients generated by the base layer encoding unit 107 during the encoding to hold the generated reconstructed images.

In Step S314, the control unit 115 determines whether the encoding of the images of all the tiles on the base layer is finished. If the control unit 115 determines that the encoding of the images of all the tiles on the base layer is not finished (NO in Step S314), the process goes back to Step S310. The base layer dividing unit 105 extracts and outputs the tile of the next tile number to continue the process. If the control unit 115 determines that the encoding of the images of all the tiles on the base layer is finished (YES in Step S314), the process goes to Step S315.

In Step S315, the enhancement layer dividing unit 104 extracts the images of the tiles on the enhancement layer to be encoded in the order of the tile numbers from the upper left corner of the image. The enhancement layer dividing unit 104 supplies each of the extracted images of the tiles on the enhancement layer to the enhancement layer encoding unit 112.

In Step S316, the independent tile determining unit 106 compares the received tile number of the encoding target tile with the tile number in the independent tile position information, as in Step S311. If the tile number of the encoding target tile coincides with the tile number in the independent tile position information (YES in Step S316), the independent tile determining unit 106 determines that the encoding target tile is the independent tile and sets the independent tile encoding flag to one. Then, the process goes to Step S317. If the tile number of the encoding target tile does not coincide with the tile number in the independent tile position information (NO in Step S316), the independent tile determining unit 106 determines that the encoding target tile is not the independent tile and sets the independent tile encoding flag to zero. Then, the process goes to Step S319.

In Step S317, the encoding target tile is the independent tile in the frame to be encoded on the enhancement layer. Accordingly, the enlarging unit 109 receives the reconstructed image included in the independent tile set at the relatively same position as that of the encoding target tile from the reconstructed images on the base layer subjected to the local decoding, stored in the base layer reconstructing unit 108. The enlarging unit 109 performs enlargement using only the received reconstructed image with, for example, filtering to generate the enlarged image and supplies the enlarged image to the enhancement layer encoding unit 112.

In Step S318, the enhancement layer encoding unit 112 performs the prediction and the encoding of the image of the encoding target tile supplied from the enhancement layer dividing unit 104 with reference to the reconstructed image on the base layer subjected to the local decoding. Specifically, the enhancement layer encoding unit 112 performs inter-layer prediction with reference to the enlarged image generated in Step S317. The enhancement layer encoding unit 112 performs the inter-frame prediction of the encoding target tile with reference to the reconstructed image of the independent tile set at the relatively same position as that of the encoding target tile on the enhancement layer subjected to the local decoding stored in the enhancement layer reconstructing unit 113. The enhancement layer encoding unit 112 performs the intra prediction with reference to the reconstructed image subjected to the local decoding in the encoding target tile. The enhancement layer encoding unit 112 encodes information concerning the prediction obtained from the prediction (for example, the motion vector obtained with the inter-frame prediction) and the prediction error. The enhancement layer reconstructing unit 113 sequentially generates the reconstructed images on the enhancement layer using, for example, the coefficients (the prediction mode and the prediction error) generated by the enhancement layer encoding unit 112 during the encoding to hold the generated reconstructed images.

In Step S319, the encoding target tile is not the independent tile in the frame to be encoded on the enhancement layer. Accordingly, the enlarging unit 109 performs the enlargement using the entire reconstructed image on the base layer stored in the base layer reconstructing unit 108 with, for example, the filtering to generate the enlarged image and supplies the enlarged image to the enhancement layer encoding unit 112.

In Step S320, the enhancement layer encoding unit 112 encodes the image of the encoding target tile supplied from the enhancement layer dividing unit 104 with reference to the reconstructed image on the base layer subjected to the local decoding. Specifically, the enhancement layer encoding unit 112 performs the inter-layer prediction with reference to the enlarged image generated in Step S319. The enhancement layer encoding unit 112 performs the inter-frame prediction of the encoding target tile with reference to the reconstructed image on the enhancement layer subjected to the local decoding stored in the enhancement layer reconstructing unit 113. The enhancement layer encoding unit 112 performs the intra prediction of the encoding target tile with reference to the reconstructed image subjected to the local decoding in the encoding target tile. The enhancement layer encoding unit 112 encodes the information concerning the prediction obtained from the prediction and the prediction error. The enhancement layer reconstructing unit 113 sequentially generates the reconstructed images on the enhancement layer using, for example, the coefficients generated by the enhancement layer encoding unit 112 during the encoding to hold the generated reconstructed images.

In Step S321, the control unit 115 determines whether the encoding of the images of all the tiles on the enhancement layer is finished. If the control unit 115 determines that the encoding of the images of all the tiles on the enhancement layer is not finished (NO in Step S321), the process goes back to Step S315. The enhancement layer dividing unit 104 extracts and outputs the tile of the next tile number to continue the process. If the control unit 115 determines that the encoding of the images of all the tiles on the enhancement layer is finished (YES in Step S321), the process goes to Step S322.

In Step S322, the control unit 115 determines whether the encoding of the images of all the frames included in the sequence supplied from the terminal 101 is finished. If any frame that is not subjected to the encoding exists (NO in Step S322), the process goes back to Step S309 to process the next frame. If no frame that is not subjected to the encoding exists (YES in Step S322), the encoding process is terminated.

With the above configuration and operation, it is possible to match the relative position of each tile on the enhancement layer with the relative position of the tile on the base layer when the independent tile and the independent tile set are used. In other words, the tile included in the independent tile set on the base layer is set so as to be included in the independent tile set at the relatively same position of that of the independent tile set on the base layer on each enhancement layer. This allows the number of pixels to be referred to for the prediction and the decoding of the independent tile to be limited in any layers in the hierarchical coding to realize high-speed prediction. In particular, since setting a target area or the like in the independent tile allows the independent tile to be independently encoded with no reference to the other tiles from the base layer to the enhancement layer, it is possible to process necessary portions at higher speed, compared with the related art.

Although the example in which the prediction and the encoding are performed using only the frame earlier than the frame to be encoded as the reference frame is described in the first embodiment, as in the example in FIG. 2, the present invention is not limited to this example. It is apparent from the above description that the same applies to a case in which the prediction and the encoding are performed with reference to multiple frames.

Although the image encoding apparatus 100 using the reduction unit 103 and the enlarging unit 109 is described in the first embodiment, the present invention is not limited to this. The reduction unit 103 and the enlarging unit 109 may be omitted. Alternatively, the quantization parameter set in the enhancement layer encoding unit 112 may be made smaller than the quantization parameter set in the base layer encoding unit 107 with a reduction ratio and an enlargement ratio being set to one. This allows signal-to-noise ratio (SNR) hierarchical coding to be realized.

Although, in the prediction of the tile in the independent tile set on the enhancement layer, the enlarged image to be referred to is generated using only the images of the tiles on the base layer at the relatively same position as that of the independent tile set in the first embodiment, the present invention is not limited to this. In other words, the pixels around the independent tile on the base layer may also be referred to, as in Step S319.

Although the hierarchical coding of the base layer and one enhancement layer (the hierarchical coding of the two layers in total) is performed in the first embodiment, the present invention is not limited to this and the hierarchical coding of three or more layers in total may be performed. In this case, provision of a set of the reduction unit 103, the enhancement layer dividing unit 104, the enhancement layer encoding unit 112, the enhancement layer reconstructing unit 113, and the enlarging unit 109 of the number of layers of the enhancement layers allows more layers to be supported. Alternatively, one enhancement layer encoding unit 112, one enhancement layer reconstructing unit 413, one enlarging unit 409, and one reduction unit 403 may be shared in the encoding of the enhancement layers, as illustrated in FIG. 4.

Figure 4:
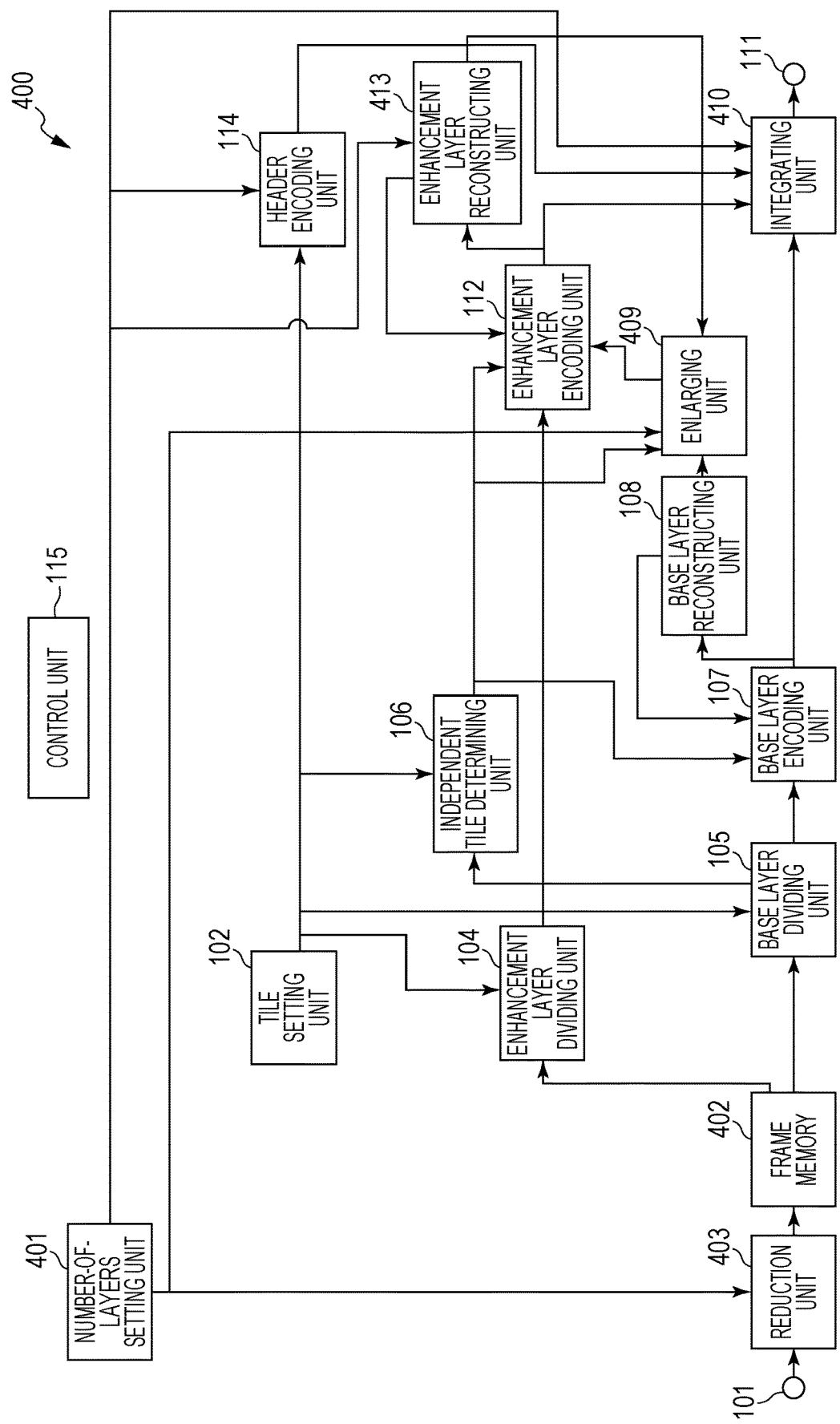
FIG. 4 is a block diagram illustrating an example of the configuration of another image encoding apparatus in the first embodiment.

FIG. 4 is a block diagram illustrating an example of the configuration of an image encoding apparatus 400 capable of encoding the enhancement layers of multiple layers. The image encoding apparatus in FIG. 4 includes one enhancement layer encoding unit 112, one enhancement layer reconstructing unit 413, one enlarging unit 409, and one reduction unit 403. The same reference numerals are used in FIG. 4 to identify the components having the same functions as those of the processing units in the image encoding apparatus 100 in FIG. 1. A description of such components is omitted herein. Referring to FIG. 4, a number-of-layers setting unit 401 sets the number of layers in the hierarchical coding. The reduction unit 403 reduces the size of the input image on the basis of the number layers supplied from the number-of-layers setting unit 401 to generate the reduced images of the multiple layers while the reduction unit 103 in FIG. 1 reduces the size of the input image supplied from the terminal 101 to generate one reduced image. A frame memory 402 stores the reduced image of each layer generated by the reduction unit 403. The enlarging unit 409 enlarges the reconstructed images on the basis of the number of layers supplied from the number-of-layers setting unit 401 to generate the enlarged images of the multiple layers having different resolutions while the enlarging unit 109 in FIG. 1 enlarges the reconstructed image on the base layer to the size of the enhancement layer to generate one enlarged image. The enhancement layer reconstructing unit 413 receives the number of layers from the number-of-layers setting unit 401 to generate the reconstructed images on the enhancement layers using, for example, the coefficients generated by the enhancement layer encoding unit 112 and supplies the reconstructed images to the enlarging unit 409 and the enhancement layer encoding unit 112. An integrating unit 410 receives the number of layers from the number-of-layers setting unit 401 to integrate the pieces of encoded data corresponding to the number of layers with each other to generate the bit stream.

Figure 5:
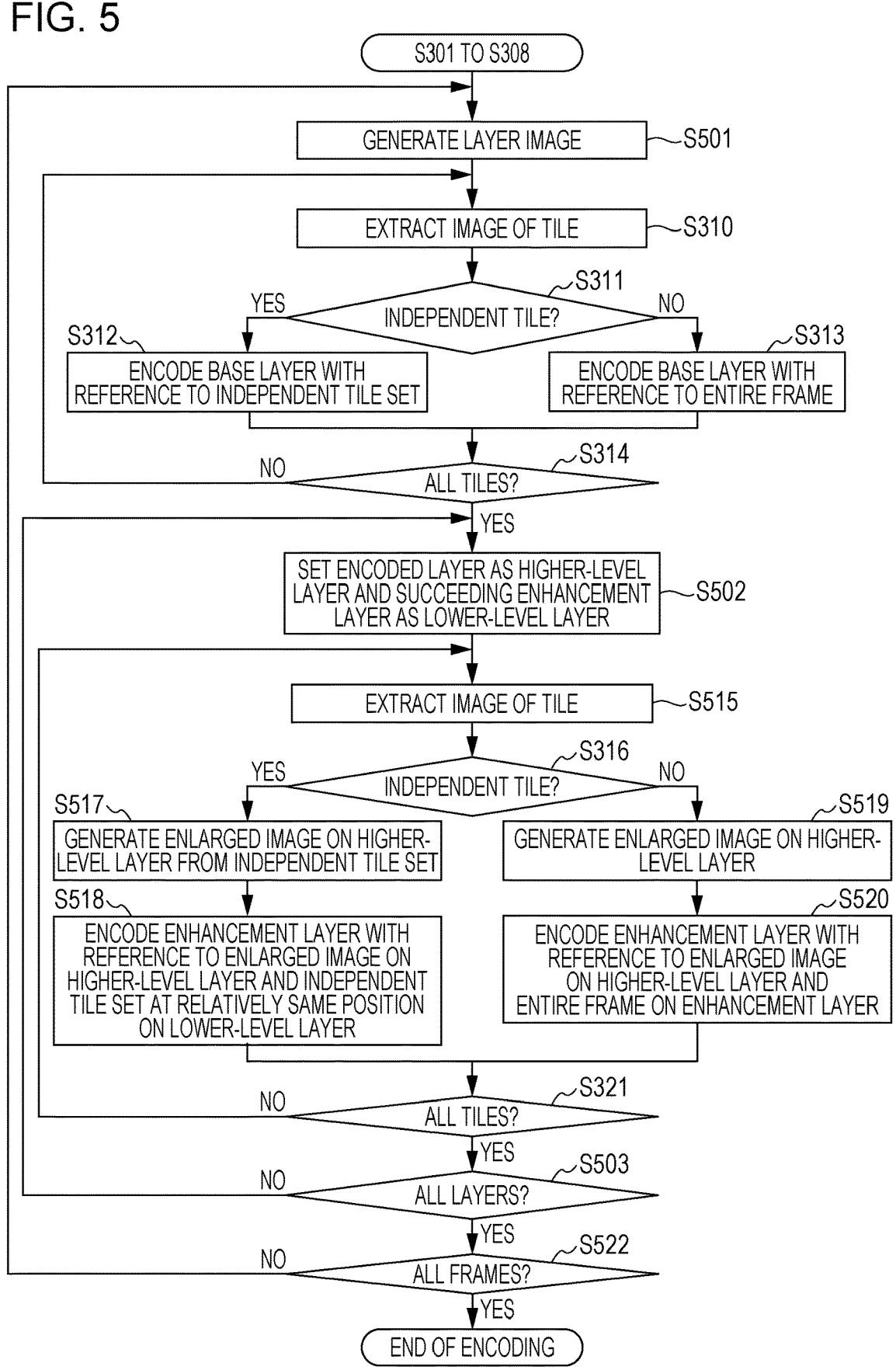
FIG. 5 is a flowchart illustrating an exemplary image encoding process in the image encoding apparatus illustrated in FIG. 4.

FIG. 5 is a flowchart illustrating an exemplary encoding process performed by the processing units in the image encoding apparatus 400 illustrated in FIG. 4. Only the steps that are different from those in FIGS. 3A and 3B, among the steps from Step S309 to Step S320 in FIGS. 3A and 3B, are described with reference to FIG. 5. The same step numbers are used in FIG. 5 to identify the steps having the same functions as those in FIGS. 3A and 3B. A description of such steps is omitted herein. It is assumed that the number-of-layers setting unit 401 sets the number of layers to three in Step S301 in FIG. 3A. The number of layers is not specially restricted. It is also assumed that the vps_max_layers_minus1 is set to two in Step S305 in FIG. 3A to generate the header encoded data.

Referring to FIG. 5, in Step S501, the reduction unit 403 generates the reduced images of the number of layers in one frame. Since the number of layers is set to three in Step S301 in the present embodiment, the reduction unit 403 generates one base layer image and two enhancement layer images. Specifically, the reduction unit 403 generates an enhancement first layer (first enhancement layer) image resulting from horizontal and vertical division of the input image into two and the base layer image resulting from horizontal and vertical division of the first enhancement layer image into two. The reduction unit 403 sets the image having the resolution of the input image as an enhancement second layer (second enhancement layer) image. The reduction unit 403 supplies the base layer image, the first enhancement layer image, and the second enhancement layer image to the frame memory 402.

In Steps S312 to S314, the control unit 115 encodes the base layer image supplied from the frame memory 402, as described above. The base layer reconstructing unit 108 performs the local decoding of the encoded image to generate the reconstructed image and holds the generated reconstructed image.

In Step S502, the number-of-layers setting unit 401 sets the base layer encoded in Step S312 or Step S313 or the enhancement layer of the layer encoded in Step S518 or Step S520 described below as the higher-level layer. The number-of-layers setting unit 401 sets the succeeding enhancement layer to be encoded as the lower-level layer. Here, the base layer encoded in Step S312 or Step S313 is set as the higher-level layer and the first enhancement layer is set as the lower-level layer.

In Step S515, the enhancement layer dividing unit 104 extracts the images of the tiles on the enhancement layer to be encoded in the order of the tile numbers from the upper left corner of the image on the layer to be encoded. The enhancement layer dividing unit 104 supplies each of the extracted images of the tiles on the enhancement layer to the enhancement layer encoding unit 112. Here, the enhancement layer dividing unit 104 extracts the image of the encoding target tile in the first enhancement layer image and supplies the image to the enhancement layer encoding unit 112.

In Step S517, the encoding target tile is the independent tile in the frame to be encoded. Accordingly, the enlarging unit 409 receives the reconstructed image included in the independent tile set at the relatively same position of that of the encoding target tile from the reconstructed images on the higher-level layer stored in the base layer reconstructing unit 108 or the enhancement layer reconstructing unit 413. The enlarging unit 409 performs enlargement using only the received reconstructed image with, for example, the filtering to generate the enlarged image and supplies the enlarged image to the enhancement layer encoding unit 112. Specifically, the enlarging unit 409 generates the enlarged image from the reconstructed images stored in the base layer reconstructing unit 108 and supplies the enlarged image to the enhancement layer encoding unit 112.

In Step S518, the enhancement layer encoding unit 112 performs the prediction and the encoding of the image of the encoding target tile supplied from the enhancement layer dividing unit 104 with reference to the reconstructed image subjected to the local decoding. Specifically, the enhancement layer encoding unit 112 performs the inter-layer prediction with reference to the enlarged image generated in Step S517. The enhancement layer encoding unit 112 performs the inter-frame prediction with reference to the reconstructed image of the independent tile set at the relatively same position as that of the encoding target tile in another frame on the enhancement layer subjected to the local decoding stored in the enhancement layer reconstructing unit 413. The enhancement layer encoding unit 112 performs the intra prediction with reference to the reconstructed image subjected to the local decoding in the encoding target tile. The enhancement layer encoding unit 112 encodes the information concerning the prediction obtained from the prediction (for example, the motion vector obtained with the inter-frame prediction) and the prediction error. The enhancement layer reconstructing unit 413 sequentially generates the reconstructed images on the enhancement layer using, for example, the coefficients (the prediction mode and the prediction error) generated by the enhancement layer encoding unit 112 during the encoding to hold the generated reconstructed images.

In Step S519, the encoding target tile is not the independent tile in the frame to be encoded. Accordingly, the enlarging unit 409 performs the enlargement using the entire reconstructed image on the base layer stored in the base layer reconstructing unit 108 or the entire reconstructed image on the higher-level enhancement layer stored in the enhancement layer reconstructing unit 413 with, for example, the filtering to generate the enlarged image. The enlarging unit 409 supplies the generated enlarged image to the enhancement layer encoding unit 112. Here, the enlarging unit 409 generates the enlarged image from the reconstructed image stored in the base layer reconstructing unit 108.

In Step S520, the enhancement layer encoding unit 112 encodes the image of the encoding target tile supplied from the enhancement layer dividing unit 104 with reference to the reconstructed image subjected to the local decoding. Specifically, the enhancement layer encoding unit 112 performs the inter-layer prediction with reference to the enlarged image generated in Step S519. The enhancement layer encoding unit 112 performs the inter-frame prediction of the encoding target tile with reference to the reconstructed image on the enhancement layer subjected to the local decoding stored in the enhancement layer reconstructing unit 413. The enhancement layer encoding unit 112 performs the intra prediction of the encoding target tile with reference to the reconstructed image subjected to the local decoding in the encoding target tile. The enhancement layer encoding unit 112 encodes the information concerning the prediction obtained from the prediction and the prediction error. The enhancement layer reconstructing unit 413 sequentially generates the reconstructed images on the enhancement layer using, for example, the coefficients generated by the enhancement layer encoding unit 112 during the encoding to hold the generated reconstructed images.

In Step S503, the control unit 115 determines whether the encoding of all the layers set by the number-of-layers setting unit 401 is finished. If the control unit 115 determines that the encoding of the tiles of all the layers is not finished (NO in Step S503), the process goes back to Step S502. The number-of-layers setting unit 401 sets the succeeding layer as the lower-level layer to continue the process. If the control unit 115 determines that the encoding of the tiles of all the layers is finished (YES in Step S503), the process goes to Step S522. Here, the control unit 115 determines that the encoding of the second enhancement layer is not finished (NO in Step S503). The process goes back to Step S502.

In Step S522, the control unit 115 determines whether the encoding of the images of all the frames included in the sequence supplied from the terminal 101 is finished. If any frame that is not subjected to the encoding exists (NO in Step S522), the process goes back to Step S501 to process the next frame. If no frame that is not subjected to the encoding exists (YES in Step S522), the encoding process is terminated.

The encoding of the second enhancement layer image will now be described. In Step S502, the number-of-layers setting unit 401 sets the first enhancement layer encoded in Step S518 or Step S520 as the higher-level layer and sets the second enhancement layer as the lower-level layer. In Step S515, the enhancement layer dividing unit 104 extracts the image of the encoding target tile in the second enhancement layer image and supplies the extracted image to the enhancement layer encoding unit 112.

In Step S517, the encoding target tile is the independent tile in the frame to be encoded. Accordingly, the enlarging unit 409 receives the reconstructed image included in the independent tile set at the relatively same position of that of the encoding target tile from the reconstructed images on the higher-level layer (the first enhancement layer) stored in the enhancement layer reconstructing unit 413. The enlarging unit 409 performs the enlargement using only the received reconstructed image in the independent tile set with, for example, the filtering to generate the enlarged image on the higher-level layer (the first enhancement layer) and supplies the enlarged image to the enhancement layer encoding unit 112. In Step S518, the enhancement layer encoding unit 112 performs the prediction and the encoding of the image of the encoding target tile on the lower-level layer (the second enhancement layer) supplied from the enhancement layer dividing unit 104 with reference to the reconstructed image subjected to the local decoding. Specifically, the enhancement layer encoding unit 112 performs the inter-layer prediction with reference to the enlarged image on the higher-level layer (the first enhancement layer) generated in Step S517. The enhancement layer encoding unit 112 performs the inter-frame prediction with reference to the image of the independent tile set at the relatively same position as that of the encoding target tile on the lower-level layer (the second enhancement layer) subjected to the local decoding stored in the enhancement layer reconstructing unit 413. The enhancement layer encoding unit 112 performs the intra prediction with reference to the reconstructed image on the lower-level layer (the second enhancement layer) subjected to the local decoding in the encoding target tile. The enhancement layer encoding unit 112 encodes the information concerning the prediction obtained from the prediction (for example, the motion vector obtained with the inter-frame prediction) and the prediction error. The enhancement layer reconstructing unit 413 sequentially generates the reconstructed images on the lower-level layer (the second enhancement layer) using, for example, the coefficients generated by the enhancement layer encoding unit 112 during the encoding to hold the generated reconstructed images.

In Step S519, the encoding target tile is not the independent tile in the frame to be encoded. Accordingly, the enlarging unit 409 performs the enlargement using the reconstructed image on the higher-level enhancement layer (the first enhancement layer) stored in the enhancement layer reconstructing unit 413 with, for example, the filtering to generate the enlarged image on the higher-level layer (the first enhancement layer). The enlarging unit 409 supplies the generated enlarged image to the enhancement layer encoding unit 112.

In Step S520, the enhancement layer encoding unit 112 encodes the image of the encoding target tile supplied from the enhancement layer dividing unit 104 with reference to the reconstructed image subjected to the local decoding. Specifically, the enhancement layer encoding unit 112 performs the inter-layer prediction with reference to the enlarged image on the higher-level layer (the first enhancement layer) generated in Step S519. The enhancement layer encoding unit 112 performs the inter-frame prediction with reference to the reconstructed image on the lower-level layer (the second enhancement layer) subjected to the local decoding stored in the enhancement layer reconstructing unit 413. The enhancement layer encoding unit 112 performs the intra prediction with reference to the reconstructed image subjected to the local decoding in the encoding target tile on the lower-level layer (the second enhancement layer). The enhancement layer encoding unit 112 encodes the information concerning the prediction obtained from the prediction and the prediction error. The enhancement layer reconstructing unit 413 sequentially generates the reconstructed images on the lower-level layer (the second enhancement layer) using, for example, the coefficients generated by the enhancement layer encoding unit 112 during the encoding to hold the generated reconstructed images.

In Step S503, the control unit 115 determines whether the encoding of all the layers set by the number-of-layers setting unit 401 is finished. If the control unit 115 determines that the encoding of all the layers is finished (YES in Step S503), the process goes to Step S522. If the control unit 115 determines that the encoding of all the layers is not finished (YES in Step S503), the process goes back to Step S502. Here, since the encoding is finished to the second enhancement layer, the process goes to Step S522. In Step S522, the control unit 115 determines whether the encoding of the images of all the frames included in the sequence supplied from the terminal 101 is finished. If the control unit 115 determines that the encoding of the images of all the frames is finished (YES in Step S522), the encoding process is terminated.

With the above process, also when the enhancement layers of the multiple layers exist, it is possible to generate the encoded data in which only the encoded data requiring the independent tile set is decoded to reproduce the decoded image with reference only to the minimum amount of image data.

When the MCTS SEI exists in the bit stream, the tile_boundaries_aligned_flag of the vui_parameters, which is the coincidence information about the tile position, is constantly set to one. In other words, when the MCTS SEI exists in the bit stream in the vui_parameters, the tile- _boundaries_aligned_flag as the encoded data may be omitted. If no MCTS SEI exists in the bit stream, the value of the tile_boundaries_aligned_flag is encoded and the encoded data is included in the bit stream. If the MCTS SEI exists in the bit stream, the value of the tile_boundaries_aligned_flag is not encoded and is constantly set to one at the decoding side. This allows the redundant tile_boundaries_aligned_flag to be reduced.

In the hierarchical coding, cutting out an important area and adapting the independent tile set to the area that is cut out for encoding allows the encoded data from which the important area is read out at high speed to be generated.

Second Embodiment

Figure 6:
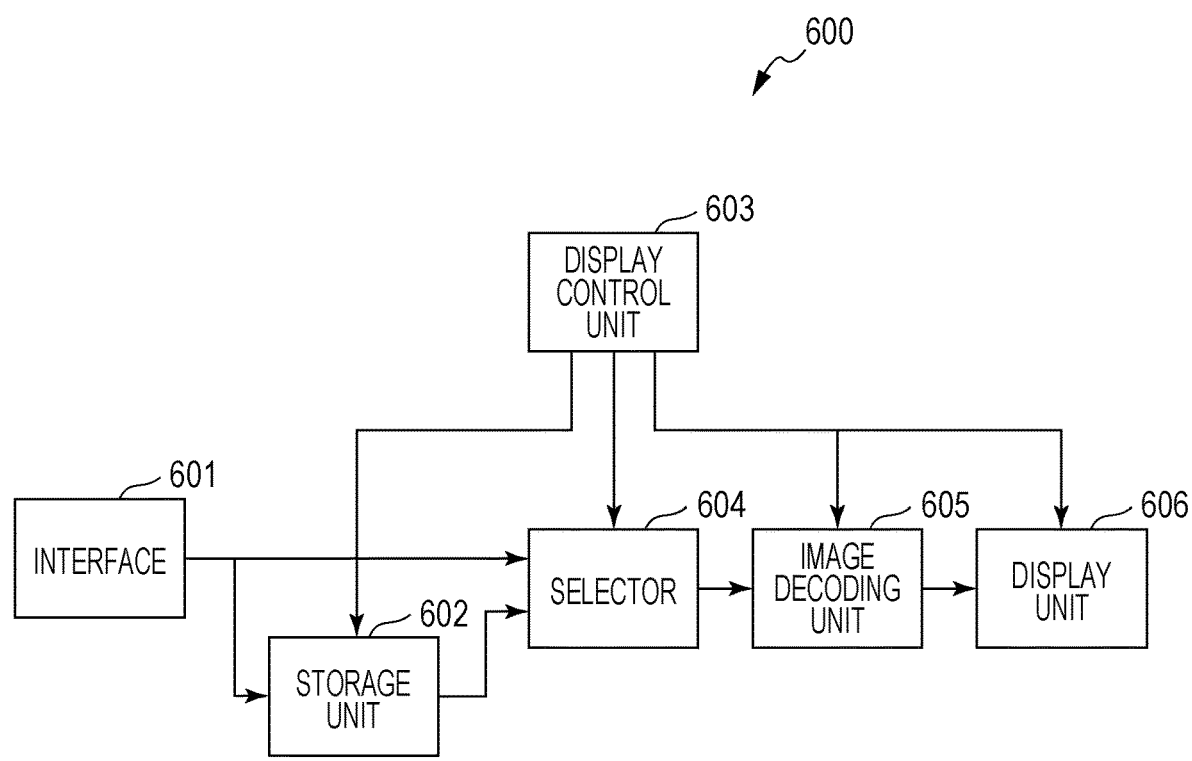
FIG. 6 is a block diagram illustrating an example of the configuration of an image decoding apparatus according to a second embodiment.

An outline of each processing unit composing an image decoding apparatus according to a second embodiment will now be described with reference to FIG. 6. FIG. 6 is a block diagram illustrating an example of the configuration of an image decoding apparatus 600 including an image decoding unit 605 of the second embodiment. A case in which the bit stream generated in the first embodiment is decoded is exemplified in the second embodiment.

Referring to FIG. 6, the bit stream is input into the image decoding apparatus 600 by communication, etc. through an interface 601. A storage unit 602 stores the bit stream supplied from the interface 601 and bit streams that are recorded in advance. A display control unit 603 specifies a method of displaying the bit stream instructed by the user. The display control unit 603 supplies a layer (hierarchy) to be decoded and an area (display area) to be decoded to the image decoding unit 605 as a display control signal. Although the layers to be decoded are represented by the number of layers and the display area is represented by the position of a tile to be displayed in the second embodiment, the present invention is not limited to this. A selector 604 specifies a destination of the bit stream that is input. The image decoding unit 605 will be described in detail below. A display unit 606 displays the decoded image generated by the image decoding unit 605.

A display operation of an image in the image decoding apparatus 600 will now be described. A case will be described in which the display control unit 603 receives an instruction to decode and display the base layer image in the bit stream from the user. This corresponds to a case in which the bit stream resulting from encoding of an image captured by a monitoring camera or the like is received to monitor the entire image that is captured. The interface 601 receives the bit stream (input bit stream) input into the image decoding apparatus 600 for each frame from the monitoring camera or the like and supplies the input bit stream to the storage unit 602 and the selector 604. The storage unit 602 records the input bit stream. The selector 604 supplies the input bit stream to the image decoding unit 605 in response to an instruction from the display control unit 603. The image decoding unit 605 receives information about a layer to be displayed, a tile to be displayed, and so on from the display control unit 603 as the display control signal. Specifically, since the display control unit 603 receives the instruction to decode and display the base layer image in the bit stream from the user, information indicating that the layer to be decoded is the base layer and information indicating that the display area is all the tiles are supplied to the image decoding unit 605.

An outline of each processing unit composing the image decoding unit 605 according to the second embodiment will now be described with reference to FIG. 7. FIG. 7 is a block diagram illustrating an example of the configuration of the image decoding unit 605 of the second embodiment.

Referring to FIG. 7, the bit stream supplied from the selector 604 is input into the image decoding unit 605 through a terminal 701. It is assumed for simplicity that the header data and the encoded data for each frame are input as the bit stream. Although the encoded data about all the layers (layer encoded data) composing one frame is included in the encoded data for each frame in the second embodiment, the present invention is not limited to this and the data may be input into the image decoding unit 605 for each slice. The data structure of the frame is not limited to this.

The display control signal concerning the decoding, supplied from the display control unit 603 in FIG. 6, is input into the image decoding unit 605 through a terminal 702. Positional information about a layer to be decoded and a tile to be decoded is input as the display control signal. The display control signal input into the terminal 702 is supplied to a separator 704, a base layer decoder 707, and an enhancement layer decoder 710. A buffer 703 stores the layer encoded data corresponding to one frame supplied from the terminal 701.

The separator 704 separates the header encoded data, the base layer encoded data, and the enhancement layer encoded data on each enhancement layer from the layer encoded data supplied from the buffer 703. The separator 704 separates the layer encoded data (the base layer encoded data and the enhancement layer encoded data on each enhancement layer) separated for each layer into the encoded data for each tile and outputs the encoded data for each tile. The separator 704 supplies the encoded data for each tile to a header decoder 705, the base layer decoder 707, and the enhancement layer decoder 710. The separator 704 supplies the number of the tile to be output (the tile to be decoded) to an independent tile determiner 706 as the positional information about the tile when the encoded data for each tile is supplied to each processing unit.

The header decoder 705 decodes the header encoded data for each sequence and for each picture to reproduce the parameter necessary for the decoding. In particular, when the MCTS SEI exists in the header encoded data, the header decoder 705 also decodes the MCTS SEI. The header decoder 705 decodes and reproduces the independent tile flag and the independent tile position information. The independent tile determiner 706 determines whether the tile to be decoded (decoding target tile) is the independent tile. The independent tile determiner 706 determines whether the decoding target tile is the independent tile on the basis of the independent tile flag and the independent tile position information supplied from the header decoder 705 and the positional information about the decoding target tile supplied from the separator 704. The independent tile determiner 706 supplies the result of the determination to the base layer decoder 707 and the enhancement layer decoder 710.

The base layer decoder 707 decodes the encoded data about each tile on the base layer separated by the separator 704 to generate the decoded image on the base layer. A frame memory 708 holds the decoded image of each tile on the base layer generated by the base layer decoder 707. An enlarger 709 enlarges the decoded image on the base layer to the resolution of the enhancement layer to generate the enlarged image. A selector 720 selects a desired decoded image, among the decoded image on the base layer and the decoded image on the enhancement layer, to supply the selected decoded image to a terminal 712. The decoded image supplied from the selector 720 is output to the outside of the image decoding unit 605 through the terminal 712.

The enhancement layer decoder 710 decodes the encoded data about each tile on the enhancement layer separated by the separator 704 to generate the decoded image on the enhancement layer. A frame memory 711 holds the decoded image of each tile on the enhancement layer generated by the enhancement layer decoder 710.

A controller 714 controls the processing units in the image decoding unit 605 and transfers the parameter between the processing units. Connection lines between the controller 714 and the processing units in the image decoding unit 605 are omitted in FIG. 7. The controller 714 is capable of controlling the processing units in the image decoding unit 605 and reading and writing the parameter between the processing units via a parameter signal line or a register bus. Although the controller 714 in FIG. 7 is provided in the image decoding unit 605 in the second embodiment, the present invention is not limited to this. Specifically, the controller 714 may be provided outside the image decoding unit 605 to control the processing units in the image decoding unit 605 and read and write the parameter between the processing units via the parameter signal line or the register bus.

FIGS. 8A and 8B are flowcharts illustrating an exemplary decoding process of an image in the image decoding unit 605 described above.

A case will now be described in which the layer to be decoded (decoding target layer) is only the base layer. It is assumed here that the display control unit 603 receives an instruction to decode and display the base layer in the bit stream supplied from the interface 601 from the user.

Referring to FIGS. 8A and 8B, in Step S801, the header encoded data at the head of the bit stream, input into the image decoding unit 605 through the terminal 701, is supplied to the header decoder 705 through the processing in the buffer 703 and the separator 704. The header decoder 705 decodes the video_parameter_set, which a sequence header. The video_parameter_set includes the vps_max_layers_minus1 indicating the number of layers in the hierarchical coding. The vps_max_layers_minus1 is set to one in the second embodiment. Then, the header decoder 705 decodes the Sequence parameter set. The Sequence parameter set includes the vui_parameters. The vui_parameters includes the tile_boundaries_aligned_flag, which is the coincidence information about the tile position. The tile_boundaries_aligned_flag is set to one in the second embodiment.

In Step S802, the header decoder 705 decodes the Picture Parameter Set. Since the decoding of the header encoded data is described in detail in NPL 1, a description of the decoding of the header encoded data is omitted herein.

In Step S803, the header decoder 705 determines whether the independent tile is included in the frame to be decoded. The header decoder 705 uses the result of the determination as the independent tile flag. The header decoder 705 practically determines whether the MCTS SEI exists. If the header decoder 705 determines that the MCTS SEI exists in the header encoded data (YES in Step S803), the header decoder 705 sets the independent tile flag to one. Then, the process goes to Step S804. If the header decoder 705 determines that the MCTS SEI does not exist in the header encoded data (NO in Step S803), the header decoder 705 sets the independent tile flag to zero. Then, the process goes to Step S805. In the second embodiment, the header decoder 705 determines that the MCTS SEI exists in the header encoded data and the header decoder 705 sets the independent tile flag to one. Then, the process goes to Step S804. When the independent tile exists in the frame to be decoded, it is necessary to set the tile_boundaries_aligned_flag of the vui_parameters, which is the coincidence information about the tile position, to one. If the tile_boundaries_aligned_flag of the vui_parameters is not set to one, the header decoder 705 may return an error to stop the decoding. The header decoder 705 supplies the independent tile flag to the independent tile determiner 706, the base layer decoder 707, and the enhancement layer decoder 710.

In Step S804, the header decoder 705 decodes the MCTS SEI to acquire the independent tile flag and the independent tile position information.

In Step S805, the separator 704 receives the positional information about the tile in the display area supplied from the terminal 702. In the second embodiment, the display of the entire base layer is instructed. Accordingly, all the tiles on the base layer are in the display area. Specifically, the separator 704 extracts the encoded data about the decoding target tile on the base layer from the buffer 703 in the order of the tile numbers from the tile 0 and supplies the encoded data about the decoding target tile on the base layer to the base layer decoder 707.

In Step S806, the independent tile determiner 706 receives the number of the decoding target tile from the separator 704. The independent tile determiner 706 receives the independent tile position information from the header decoder 705. One independent tile set exists and the independent tile position information indicates five and six in the second embodiment. The independent tile determiner 706 compares the tile number of the decoding target tile with the tile number in the independent tile position information. If the independent tile determiner 706 determines that the tile number of the decoding target tile coincides with the tile number in the independent tile position information (YES in Step S806), the independent tile determiner 706 determines that the decoding target tile is the independent tile. Then, the process goes to Step S807. If the independent tile determiner 706 determines that the tile number of the decoding target tile does not coincide with the tile number in the independent tile position information (NO in Step S806), the independent tile determiner 706 determines that the decoding target tile is not the tile in the independent tile set. Then, the process goes to Step S808.

In Step S807, the decoding target tile is the independent tile in the frame to be decoded on the base layer. Accordingly, the base layer decoder 707 performs the decoding with reference only to the independent tile in the independent tile set at the relatively same position as that of the decoding target tile in another frame on the decoded base layer and the decoded pixels in the decoding target tile. Specifically, the base layer decoder 707 performs the inter-frame prediction with reference to the decoded image of the independent tile in the independent tile set at the relatively same position as that of the decoding target tile, stored in the frame memory 708. The base layer decoder 707 performs the intra prediction with reference to the decoded image in the decoding target tile stored in the frame memory 708. The base layer decoder 707 stores the decoded image of the decoding target tile on the decoded base layer in the frame memory 708. The decoded image is referred to in the decoding of the subsequent tile. The base layer decoder 707 supplies the decoded image of the decoding target tile on the base layer to the display unit 606 in FIG. 6 via the selector 720 and the terminal 712.

In Step S808, the decoding target tile is not the independent tile in the frame to be decoded on the base layer. Accordingly, the base layer decoder 707 performs the decoding with reference to the decoded image on the base layer of the decoded frame and the decoded pixels on the base layer of the frame to be decoded. Specifically, the base layer decoder 707 performs the inter-frame prediction with reference to the decoded image stored in the frame memory 708. The base layer decoder 707 performs the intra prediction with reference to the decoded image in the decoding target tile. The base layer decoder 707 stores the decoded image of the decoding target tile on the decoded base layer in the frame memory 708. The decoded image is referred to in the decoding of the subsequent tile. The base layer decoder 707 supplies the decoded image of the decoding target tile on the base layer to the display unit 606 in FIG. 6 via the selector 720 and the terminal 712.

In Step S809, the controller 714 determines whether the decoding of the encoded data about all the tiles corresponding to one frame on the base layer is finished. If the controller 714 determines that the decoding of the encoded data about all the tiles corresponding to one frame on the base layer is not finished (NO in Step S809), the process goes back to Step S805. The separator 704 extracts and outputs the next tile to continue the process. If the controller 714 determines that the decoding of the encoded data about all the tiles corresponding to one frame on the base layer is finished (YES in Step S809), the process goes to Step S810.

In Step S810, the separator 704 determines whether the enhancement layer is included in the layers to be decoded and displayed on the basis of the display control signal supplied from the display control unit 603 in FIG. 6 via the terminal 702. If the decoding and the display of the enhancement layer is instructed (YES in Step S810), the process goes to Step S811. If the decoding and the display of the enhancement layer is not instructed (NO in Step S810), the process goes to Step S818. Since only the base layer is to be decoded here, the process goes to Step S818. The enhancement layer decoder 710 does not perform the decoding.

In Step S818, the controller 714 determines whether the decoding of the encoded data on the base layer or the encoded data on the enhancement layer of all the frames included in the sequence supplied from the terminal 701 is finished. Here, the controller 714 determines whether the decoding of the encoded data on the base layer of all the frames is finished. If any encoded data on the base layer or the enhancement layer which is not subjected to the decoding exists (NO in Step S818), the process goes back to Step S805 to process the next frame. If no encoded data about the frame which is not subjected to the decoding exists (YES in Step S818), the decoding process is terminated.

The image decoded by the image decoding unit 605 is supplied to the display unit 606 in FIG. 6. The display unit 606 displays the entire decoded image on the base layer supplied from the image decoding unit 605 in response to an instruction to display the image on the base layer from the display control unit 603.

When the display of the base layer of the moving image that is recorded is instructed from the display control unit 603 in response to an instruction from the user, the selector 604 receives the input from the storage unit 602. The display control unit 603 performs control so that a required bit stream is selected from the storage unit 602 and the selected bit stream is supplied to the selector 604.

A case will now be described in which the decoding target layer is the enhancement layer. A decoding process when the display control unit 603 receives an instruction to decode the enhancement layer in the bit stream supplied from the interface 601 and display of part of the enhancement layer in the bit stream from the user will be described here. This corresponds to a case in which part of an image captured by a monitoring camera or the like is monitored in detail. The image decoding unit 605 receives an instruction about the numbers of the tiles included in the area to be decoded and displayed on the base layer and the enhancement layer from the display control unit 603. It is assumed in the second embodiment for simplicity that the tiles included in the area to be displayed are the tile 5 and the tile 6 in FIG. 2. An exemplary decoding process of an image on the enhancement layer in the image decoding unit 605 will now be described with reference to the flowcharts in FIGS. 8A and 8B, as in the case in which the image decoding unit 605 receives the instruction to decode and display only the base layer. The steps common to the decoding process of only the base layer are simply described.

In Step S801, the header decoder 705 decodes the video_parameter_set and the Sequence parameter set, as in the case in which the display of only the base layer is instructed. The header decoder 705 decodes the vps_max_layers_minus1 in the video_parameter_set and the tile_boundaries_aligned_flag in the Sequence parameter set.

In Step S802, the header decoder 705 decodes the Picture Parameter Set, as in the display of only the base layer.

In Step S803, the header decoder 705 determines whether the independent tile exists in the header encoded data, as in the display of only the base layer.

In Step S804, the header decoder 705 decodes the MCTS SEI to acquire the independent tile flag and the independent tile position information, as in the display of only the base layer.

In Step S805, the separator 704 receives the positional information about the tiles in the display area supplied from the terminal 702. In the second embodiment, the positions of the tiles the display of which is specified are the tile 5 and the tile 6. Accordingly, the separator 704 sets the tile 5 as the decoding target tile on the basis of the positional information about the tiles the display of which is specified, supplied from the terminal 702, extracts the encoded data on the base layer of the tile 5, and supplies the extracted encoded data to the base layer decoder 707. The separator 704 supplies the positional information about the tiles the display of which is specified to the independent tile determiner 706.

In Step S806, the independent tile determiner 706 compares the tile number of the decoding target tile with the tile number in the independent tile position information. Since the tile 5, which is the decoding target tile, is the independent tile, the process goes to Step S807.

In Step S807, the decoding target tile is the independent tile. The base layer decoder 707 decodes the encoded data about the tile 5 on the base layer to generate the decoded image and stores the decoded image in the frame memory 708, as in the display of only the base layer. Since the display of the enhancement layer is to be performed here, the base layer decoder 707 does not output the generated decoded image from the terminal 712. However, the present invention is not limited to this and the base layer decoder 707 may output the decoded image. In this case, both the decoded image generated by the base layer decoder 707 and the decoded image generated by the enhancement layer decoder 710 may be output and the display unit 606 may select either of the decoded images to display the selected decoded image.

In Step S809, the controller 714 determines whether the decoding of the encoded data about all the tiles on the base layer in the display area, supplied from the separator 704, is finished. Since the decoding of the encoded data about the tile 6 is not finished here, the process goes back to Step S805 to decode the encoded data on the base layer of the tile 6.

The decoding of the encoded data on the base layer of the tile 6 will now be described.

In Step S805, the separator 704 extracts the encoded data on the base layer of the tile 6. In Step S806, the independent tile determiner 706 compares the tile number of the decoding target tile with the tile number in the independent tile position information. Since the tile 6, which is the decoding target tile, is the independent tile, the process goes to Step S807. In Step S807, the base layer decoder 707 decodes the encoded data on the base layer of the tile 6 to generate the decoded image and stores the generated decoded image in the frame memory 708.

In Step S809, the controller 714 determines that the decoding of the encoded data about all the tiles on the base layer in the display area, supplied from the separator 704, is finished (YES in Step S809). Then, the process goes to Step S810.

In Step S810, the separator 704 determines whether the enhancement layer is included in the layers to be displayed on the basis of the display control signal supplied from the display control unit 603 in FIG. 6 via the terminal 702. Since the enhancement layer is to be displayed here (YES in Step S810), the process goes to Step S811.

In Step S811, the separator 704 receives the positional information about the tiles in the display area, supplied from the terminal 702, as in Step S805. The positions of the tiles the display of which is specified are the tile 5 and the tile 6 here. Accordingly, the separator 704 extracts the encoded data on the enhancement layer of the tile 5, which is the decoding target tile, on the basis of the received positional information about the tiles the display of which is specified and supplies the extracted encoded data to the enhancement layer decoder 710. The separator 704 supplies the positional information about the tiles the display of which is specified to the independent tile determiner 706.

In Step S812, the independent tile determiner 706 compares the tile number of the decoding target tile with the tile number in the independent tile position information, as in Step S806. If the tile number of the decoding target tile coincides with the tile number in the independent tile position information (YES in Step S812), the process goes to Step S813. If the tile number of the decoding target tile does not coincide with the tile number in the independent tile position information (NO Step S812), the process goes to Step S815. The independent tile position information indicates five and six here. Accordingly, the independent tile determiner 706 determines that the tile 5, which is the decoding target tile, is the tile in the independent tile set (YES in Step S812). The process goes to Step S813.

In Step S813, the decoding target tile is the independent tile in the frame to be decoded on the enhancement layer. The enlarger 709 receives the decoded image included in the independent tile set at the relatively same position of that of the decoding target tile from the decoded images on the decoded base layer stored in the frame memory 708. The enlarger 709 performs enlargement using only the received decoded image of the independent tile with, for example, the filtering to generate the enlarged image and supplies the enlarged image to the enhancement layer decoder 710.

In Step S814, the enhancement layer decoder 710 decodes the encoded data on the enhancement layer of the decoding target tile supplied from the separator 704. The enhancement layer decoder 710 generates the decoded image with reference to the enlarged image supplied from the enlarger 709, the decoded image on the decoded enhancement layer stored in the frame memory 711, and the decoded pixels in the decoding target tile. Specifically, the enhancement layer decoder 710 performs the inter-layer prediction with reference to the enlarged image on the base layer generated in Step S813. The enhancement layer decoder 710 performs the inter-frame prediction with reference to the decoded image in the independent tile set at the relatively same position as that of the decoding target tile, among the decoded images on the enhancement layer stored in the frame memory 711. The enhancement layer decoder 710 performs the intra prediction with reference to the decoded image in the decoding target tile. In the example in FIG. 2, in the decoding of the tile 5 in the frame 206, the enhancement layer decoder 710 performs the decoding with reference to the enlarged image of the frame 204, the decoded images of the tile 5 and the tile 6 of the decoded frame 205, and the decoded pixels in the tile 5 of the frame 206. The decoded image of the tile on the enhancement layer generated by the enhancement layer decoder 710 is supplied to the frame memory 711 and is held in the frame memory 711. The decoded image on the enhancement layer generated by the enhancement layer decoder 710 is supplied to the display unit 606 in FIG. 6 via the selector 720 and the terminal 712.

In Step S817, the controller 714 determines whether the decoding of the encoded data about all the tiles on the enhancement layer in the display area supplied from the separator 704 is finished. Since the decoding of the encoded data on the enhancement layer of the tile 6 is not finished here (NO in Step S817), the process goes back to Step S811 to decode the encoded data on the enhancement layer of the tile 6.

The decoding of the encoded data on the enhancement layer of the tile 6 will now be described.

In Step S811, the separator 704 extracts the encoded data on the enhancement layer of the tile 6. In Step S812, the independent tile determiner 706 compares the tile number of the decoding target tile with the tile number in the independent tile position information. Since the tile 6, which is the decoding target tile, is the independent tile (YES in Step S812), the process goes to Step S813.

In Step S813, the enlarger 709 generates the enlarged image using only the received decoded image of the independent tile.

In Step S814, the enhancement layer decoder 710 decodes the encoded data on the enhancement layer of the tile 6 to generate the decoded image and stores the decoded image in the frame memory 711. The enhancement layer decoder 710 refers to the enlarged image supplied from the enlarger 709, the decoded image on the decoded enhancement layer stored in the frame memory 711, and the decoded pixels in the decoding target tile in the decoding of the encoded data on the enhancement layer of the tile 6. Specifically, the enhancement layer decoder 710 performs the inter-layer prediction with reference to the enlarged image on the base layer generated in Step S813. The enhancement layer decoder 710 performs the inter-frame prediction with reference to the decoded image in the independent tile set at the relatively same position as that of the decoding target tile on the enhancement layer stored in the frame memory 711. The enhancement layer decoder 710 performs the intra prediction with reference to the decoded image in the decoding target tile. In the example in FIG. 2, in the decoding of the tile 6 in the frame 206, the enhancement layer decoder 710 performs the decoding with reference to the enlarged image of the frame 204, the decoded images of the tile 5 and the tile 6 of the decoded frame 205, and the decoded pixels in the tile 6 of the frame 206. The decoded image of the tile on the enhancement layer generated by the enhancement layer decoder 710 is supplied to the frame memory 711 and is held in the frame memory 711. The decoded image on the enhancement layer generated by the enhancement layer decoder 710 is supplied to the display unit 606 in FIG. 6 via the selector 720 and the terminal 712.

In Step S817, the controller 714 determines that the decoding of the encoded data about all the tiles on the enhancement layer in the display area is finished (YES in Step S817). The process goes to Step S818.

In Step S818, the controller 714 determines whether the decoding of the encoded data about the tiles in the display area in all the frames included in the sequence supplied from the terminal 701 is finished. If any frame that is not subjected to the decoding exists (NO in Step S818), the process goes back to Step S805 to process the next frame. If no frame that is not subjected to the decoding exists (YES in Step S818), the decoding process is terminated.

The decoding process in the case in which the display area (the decoding target tile) is composed of the independent tile set is described above. The decoding process in a case in which the display area (the decoding target tile) is not composed of the independent tile set will now be described. Steps S801 to Step S805 in the decoding process are the same as the ones described above.

In Step S806, the independent tile determiner 706 determines that the decoding target tile is not the independent tile (NO in Step S806). The process goes to Step S808. In Step S808, the base layer decoder 707 decodes the tile on the base layer to generate the decoded image and stores the generated decoded image in the frame memory 708, as in the case in which the decoding target layer is only the base layer. Since the display of the enhancement layer is to be performed here, the base layer decoder 707 does not output the generated decoded image from the terminal 712.

In Step S809, the controller 714 determines whether the decoding of the encoded data about all the tiles corresponding to one frame on the base layer is finished. The controller 714 determines here that the decoding of the encoded data about all the tiles corresponding to one frame on the base layer is finished (YES in Step S809). The process goes to Step S810. In Step S810, the separator 704 determines that the display of the enhancement layer is instructed on the basis of the display control signal that is received (YES in Step S810). The process goes to Step S811. In Step S811, the separator 704 receives the positional information about the tile in the display area from the terminal 702. The separator 704 extracts the encoded data on the enhancement layer of the decoding target tile on the basis of the received positional information. In Step S812, the independent tile determiner 706 compares the tile number of the decoding target tile with the tile number in the independent tile position information. The independent tile determiner 706 determines here that the decoding target tile is not the tile in the independent tile set (the tile number of the decoding target tile does not coincide with the tile number in the independent tile position information) (NO in Step S812). The process goes to Step S815.

In Step S815, the decoding target tile is not the independent tile. The enlarger 709 receives the decoded images of the tile on the base layer at the relatively same position as that of the decoding target tile and tiles around the tile from the decoded images on the decoded base layer stored in the frame memory 708. The enlarger 709 performs the enlargement using the received decoded images on the base layer with, for example, the filtering to generate the enlarged image and supplies the generated enlarged image to the enhancement layer decoder 710.

In Step S816, the enhancement layer decoder 710 decodes the encoded data on the enhancement layer of the decoding target tile supplied from the separator 704. The enhancement layer decoder 710 generates the decoded image with reference to the enlarged image supplied from the enlarger 709, the decoded image on the decoded enhancement layer stored in the frame memory 711, and the decoded pixels in the decoding target tile. Specifically, the enhancement layer decoder 710 performs the inter-layer prediction with reference to the enlarged image on the base layer generated in Step S815. The enhancement layer decoder 710 performs the inter-frame prediction with reference to the decoded image on the enhancement layer stored in the frame memory 711. The enhancement layer decoder 710 performs the intra prediction with reference to the decoded image in the decoding target tile. The decoded image of the tile on the enhancement layer generated by the enhancement layer decoder 710 is supplied to the frame memory 711 and is held in the frame memory 711. The decoded image on the enhancement layer generated by the enhancement layer decoder 710 is supplied to the display unit 606 in FIG. 6 via the selector 720 and the terminal 712.

In Step S817, the controller 714 determines whether the decoding of all the tiles based the positional information about the tiles in the display area supplied from the terminal 702 to the separator 704 is finished. If the decoding of all the tiles in the display area is not finished (NO in Step S817), the process goes back to Step S811. The separator 704 extracts and outputs the next tile to continue the process. If the decoding of all the tiles in the display area is finished (YES in Step S817), the process goes to Step S818.

In Step S818, the controller 714 determines whether the decoding of the encoded data corresponding to all the frames is finished. If any encoded data that is not subjected to the decoding exists (NO in Step S818), the process goes back to Step S805 to process the next frame. If no encoded data that is not subjected to the decoding exists (YES in Step S818), the decoding process is terminated.

Referring back to FIG. 6, the display unit 606 receives the instruction to display the image on the enhancement layer from the display control unit 603. Accordingly, the display unit 606 displays the decoded image on the enhancement layer decoded by the image decoding unit 605. Since the enhancement layer has resolution higher than that of the base layer, the display of the decoded image on the enhancement layer allows the display unit 606 to achieve an effect as in a case in which part of the image on the base layer is enlarged for display.

When the display of the base layer of the moving image that is recorded is instructed from the display control unit 603 in response to an instruction from the user, the selector 604 receives the input from the storage unit 602. The display control unit 603 performs control so that a required bit stream is selected from the storage unit 602 and the selected bit stream is supplied to the selector 604.

With the above configuration and operation, it is possible to match the relative position of each tile on the enhancement layer with the relative position of the tile on the base layer when the independent tile and the independent tile set are used. In other words, when the tile is included in the independent tile set on the base layer, the tile at the relatively same position as that of the tile is included in the independent tile set on each enhancement layer. Accordingly, in the decoding of the bit stream in the hierarchical coding, it is possible to decode the independent tile with reference only to the minimum amount of image data in any layer. The reduction of the image data to be referred to for the prediction in the above manner allows the amount of transfer of the data to be suppressed, the amount of calculation to be reduced, and the low power consumption to be realized. In addition, the independent decoding without reference to the tiles other than the independent tile on each layer from the base layer to the enhancement layer in the decoding of the independent tile allows the high-speed processing to be realized. In particular, performing the encoding so that the independent tile set is adapted to an important area at the encoding side to generate the bit stream allows the important area to be decoded at high speed in the decoding of the bit stream.

Although the example in which the prediction and the encoding are performed using only the frame earlier than the frame to be decoded as the reference frame is described in the second embodiment, as in the example in FIG. 2, the present invention is not limited to this example. It is apparent from the above description that the same applies to a case in which the prediction and the encoding are performed with reference to multiple frames.

Although the image decoding unit 605 using the enlarger 709 is described in the second embodiment, the present invention is not limited to this. The enlarger 709 may be omitted. Alternatively, the quantization parameter decoded in the enhancement layer decoder 710 may be made smaller than the quantization parameter decoded in the base layer decoder 707 with the enlargement ratio being set to one. This allows data in the SNR hierarchical coding to be decoded.

Although the example in which the encoded data on all the layers is included in the encoded data corresponding to one frame is described in the second embodiment, the present invention is not limited to this and the encoded data may be input for each layer. For example, the encoded data for each layer may be stored in the storage unit 602 and the encoded data on the enhancement layer may be cut out and read out from the storage unit 602, if needed.

Figure 9:
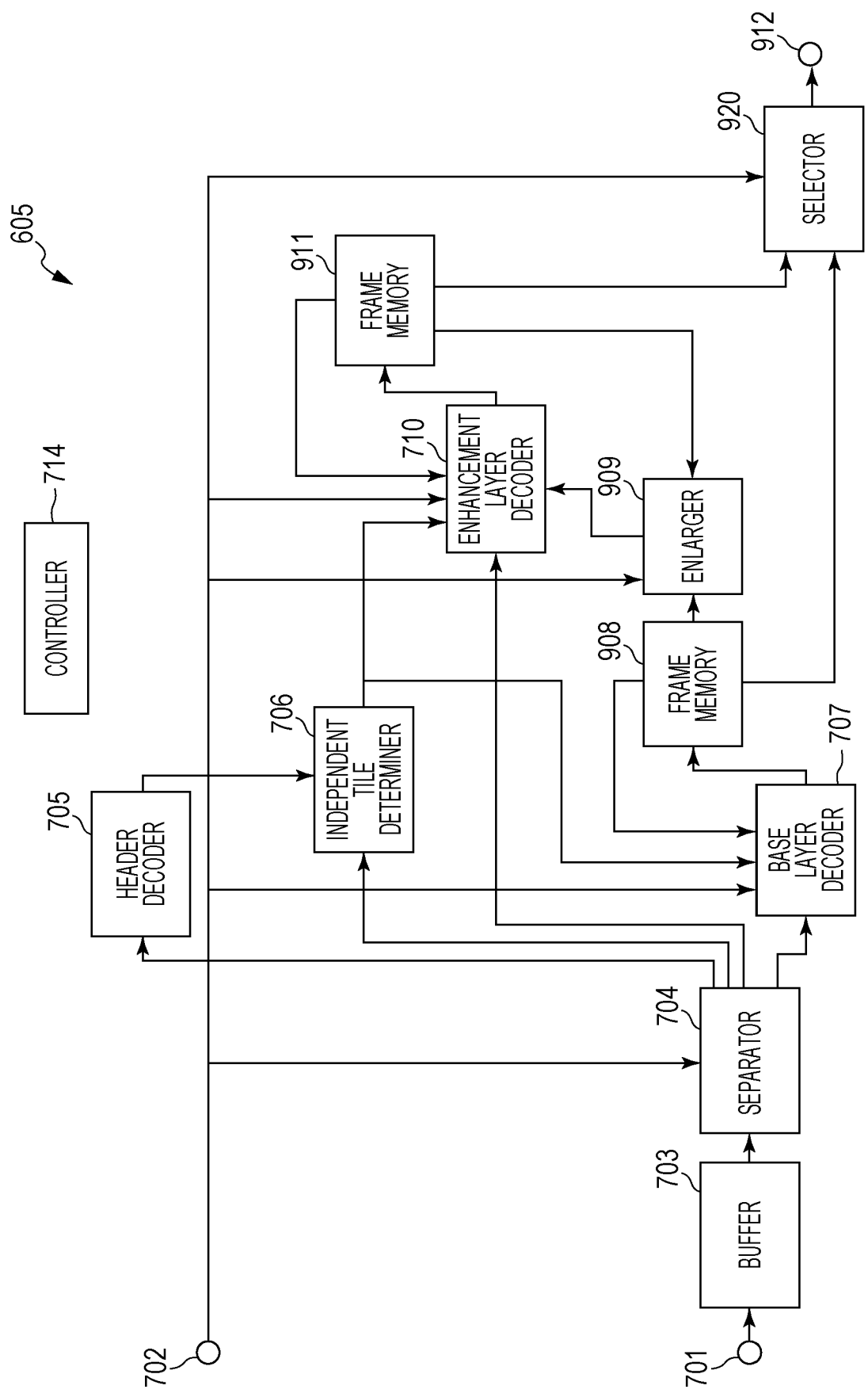
FIG. 9 is a block diagram illustrating an exemplary another configuration of the image decoding unit illustrated in FIG. 7.

Although the hierarchical coding of the base layer and one enhancement layer (the hierarchical coding of the two layers in total) is described in the second embodiment, the present invention is not limited to this and the hierarchical coding of three or more layers in total may be performed. In this case, provision of a set of the enhancement layer decoder 710, the frame memory 711, and the enlarger 709 of the number of layers of the enhancement layers allows more layers to be supported. Alternatively, one enhancement layer decoder 710, one frame memory 911, and one enlarger 909 may be shared in the decoding of the layers, as illustrated in FIG. 9. FIG. 9 is a block diagram illustrating an exemplary configuration of the image decoding unit capable of decoding the enhancement layers of multiple layers. The image decoding unit in FIG. 9 includes one enhancement layer decoder 710, one frame memory 911, and one enlarger 909. The same reference numerals are used in FIG. 9 to identify the components having the same functions as those of the processing units in the image decoding unit 605 in FIG. 7. A description of such components is omitted herein. Referring to FIG. 9, a frame memory 908 holds the decoded image generated by the base layer decoder 707. The frame memory 908 differs from the frame memory 708 in FIG. 7 in that the frame memory 908 additionally has an output function to a selector 920. The enlarger 909 differs from the enlarger 709 in FIG. 7 in that the enlarger 909 is capable of selectively receiving the input from the frame memory 911 and the input from the frame memory 908. The frame memory 911 differs from the frame memory 711 in FIG. 7 in that the frame memory 911 additionally has a function to supply the encoded data about a desired tile to the enlarger 909 and the selector 920. The selector 920 selectively receives a desired decoded image from the frame memory 908 or the frame memory 911 to supply the selected decoded image to a terminal 912. The decoded image supplied from the selector 920 is output to the outside of the image decoding unit 605 through terminal 912.

Figure 10A:
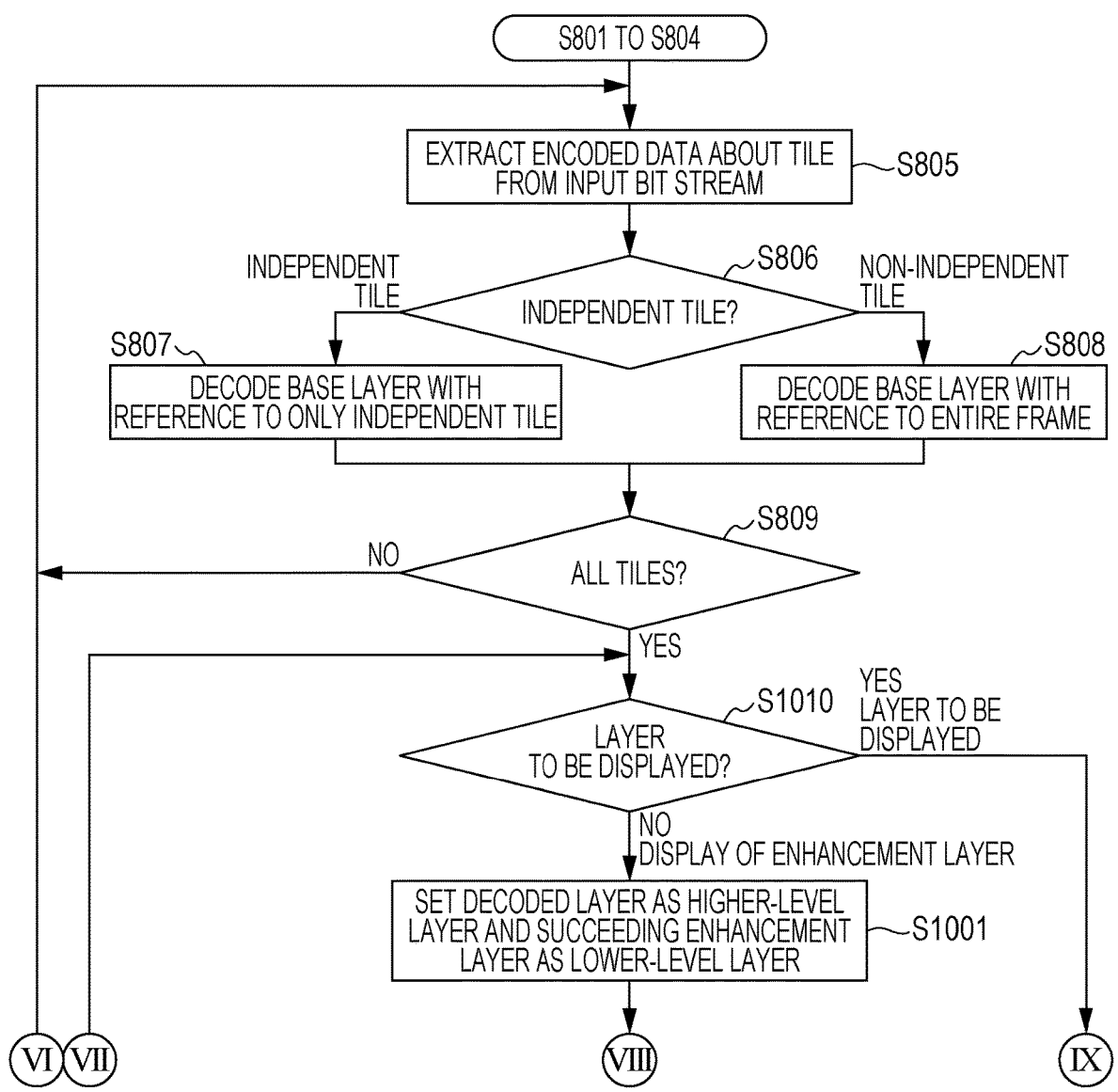
FIG. 10A is a flowchart illustrating an exemplary image decoding process in the image decoding unit illustrated in FIG. 9.
Figure 10B:
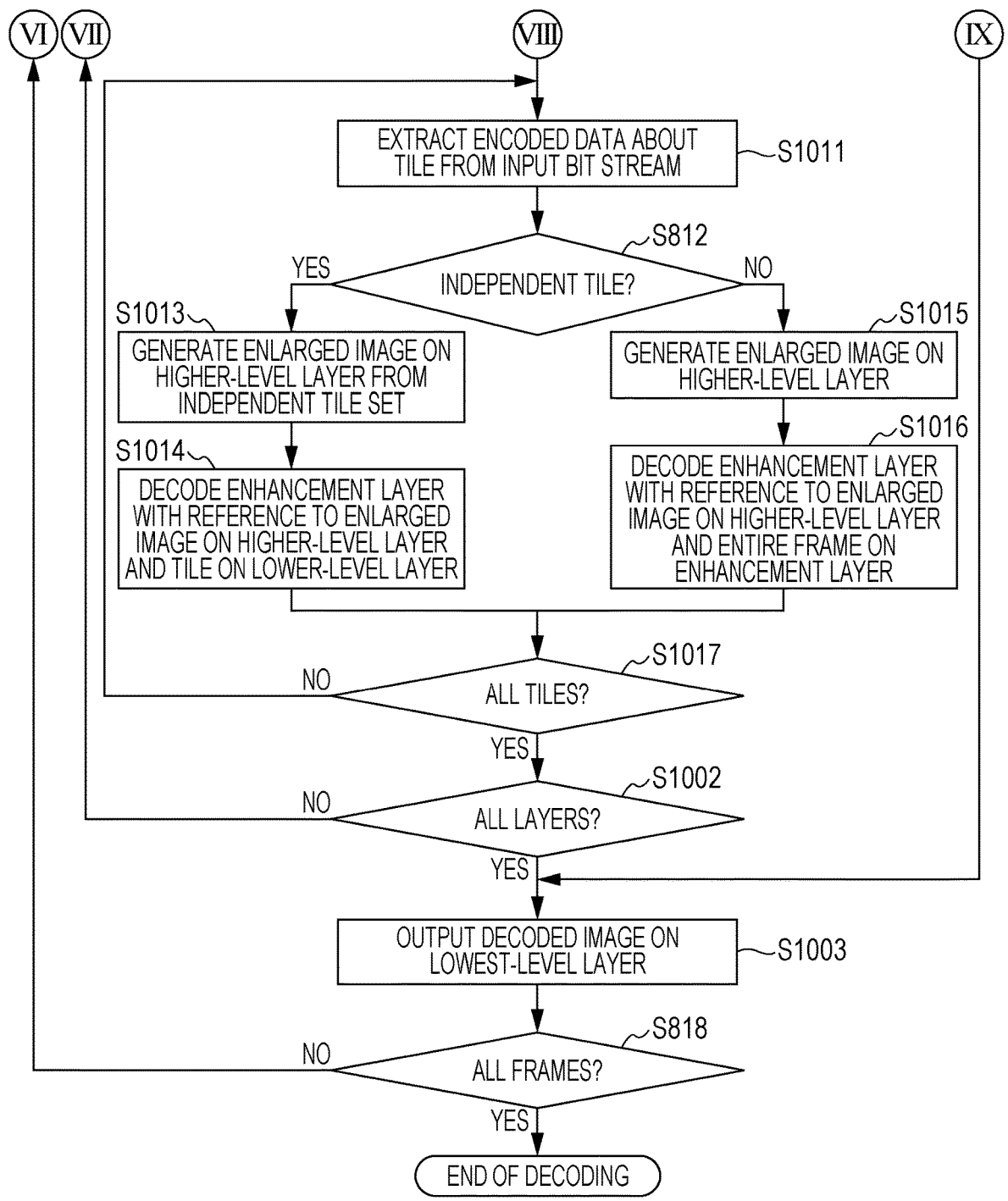
FIG. 10B is a flowchart illustrating the exemplary image decoding process in the image decoding unit illustrated in FIG. 9.

FIGS. 10A and 10B are flowcharts illustrating an exemplary decoding process performed by the processing units in the image decoding unit 605 illustrated in FIG. 9. Only the steps that are different from those in FIGS. 8A and 8B, among the steps from Step S805 to Step S818 in FIGS. 8A and 8B, are described with reference to FIGS. 10A and 10B. The same step numbers are used in FIGS. 10A and 10B to identify the steps having the same functions as those in FIGS. 8A and 8B. A description of such steps is omitted herein. An example is described here in which the bit stream that is generated with the encoding method in FIG. 5 by the image encoding apparatus 400 illustrated in FIG. 4 of the first embodiment and that has three layers is decoded. In Step 801 to Step S804, the header decoder 705 decodes the header encoded data in the manner described above. The vps_max_layers_minus1 is set to two here.

A case will now be described in which the decoding target layer is only the base layer. It is assumed here that the display control unit 603 receives an instruction to start the decoding and the display of the entire base layer in the bit stream supplied from the interface 601 from the user. It is also assumed that the decoding of one frame on the base layer is finished in Step S805 to Step S809 in FIG. 8A, as in the display of only the base layer described above. However, all the decoded images generated by the base layer decoder 707 are stored in the frame memory 908.

Referring to FIGS. 10A and 10B, in Step S1010, the base layer decoder 707 or the enhancement layer decoder 710 compares the number of decoded layers with the layer to be displayed, specified by the display control unit 603, to determine whether the layer to be displayed is decoded. If the layer to be displayed is included the number of decoded layers (YES in Step S1010), the process goes to Step S1003. If the layer to be displayed is not included the number of decoded layers (NO in Step S1010), the process goes to Step S1001. It is assumed here that the separator 704 determines that the layer to be displayed is only the base layer on the basis of the display control signal supplied from the terminal 702. Accordingly, the base layer decoder 707 determines that the layer to be displayed is included in the number of decoded layers (YES in Step S1010). The process goes to Step S1003.

In Step S1003, the selector 920 selects the decoded image on the lowest-level layer, among the decoded layers. Since the lowest-level layer is the base layer in this case, the selector 920 reads out the decoded image on the decoded base layer from the frame memory 908 and supplies the decoded image that is read out to the display unit 606 in FIG. 6 via the terminal 912. The display unit 606 displays the entire decoded image on the base layer supplied from the image decoding unit 605 in response to an instruction to display the image on the base layer from the display control unit 603.

A case will now be described in which the decoding target layer is the enhancement layer. The decoding in a case in which the display control unit 603 receives an instruction to decode the enhancement layer and display part of the decoded image on the enhancement layer in the bit stream supplied from the interface 601 from the user will be described here. It is assumed here that the layer to be displayed is the second enhancement layer (the number of layers is three). It is also assumed here for simplicity that the tiles included in the area to be displayed are the tile 5 and the tile 6 in FIG. 2. The decoding process will be described with reference to the flowcharts in FIGS. 10A and 10B, as in the case in which the decoding and the display of only the base layer is instructed. The steps common to the decoding of only the base layer is simply described.

In Step S806, the independent tile determiner 706 compares the tile number of the decoding target tile with the tile number in the independent tile position information. Since the tile 5, which is the decoding target tile, is the independent tile, the process goes to Step S807. In Step S807, the base layer decoder 707 decodes the encoded data about the tile 5 on the base layer to generate the decoded image and stores the decoded image in the frame memory 908. In Step S809, the controller 714 determines whether the decoding of the encoded data about all the tiles on the base layer in the display area, supplied from the separator 704, is finished.

In Step S1010, the base layer decoder 707 or the enhancement layer decoder 710 compares the number of decoded layers with the layer to be displayed, specified by the display control unit 603, to determine whether the layer to be displayed is decoded. Here, the layer to be displayed is the second enhancement layer (the number of layers is three) on the basis of the display control signal supplied from the terminal 702. Accordingly, the base layer decoder 707 determines that the layer to be displayed is not decoded (NO in Step S1010). The process goes to Step S1001.

In Step S1001, the enhancement layer decoder 710 sets the base layer decoded in Step S807 or Step S808 or the enhancement layer of the layer decoded in Step S1014 or Step S1016 described below as the higher-level layer. The enhancement layer decoder 710 sets the succeeding enhancement layer to be decoded as the lower-level layer. First, the enhancement layer decoder 710 sets the base layer decoded in Step S807 or Step S803 as the higher-level layer and sets the first enhancement layer as the lower-level layer.

In Step S1011, the separator 704 receives the positional information about the tiles in the display area supplied from the terminal 702. Here, the positions of the tiles in the display area are the tile 5 and the tile 6. The separator 704 extracts the encoded data on the lower-level layer (the first enhancement layer) of the tile 5, which is the decoding target tile, in the layer encoded data stored in the buffer 703 on the basis of the positional information supplied from the terminal 702. The separator 704 supplies the extracted encoded data to the enhancement layer decoder 710. The separator 704 supplies the positional information about the tile to the independent tile determiner 706.

In Step S812, the independent tile determiner 706 compares the tile number of the decoding target tile with the tile number in the independent tile position information. If the tile number of the decoding target tile coincides with the tile number in the independent tile position information (YES in Step S812), the process goes to Step S1013. If the tile number of the decoding target tile does not coincide with the tile number in the independent tile position information (NO Step S812), the process goes to Step S1015. Here, the independent tile position information indicates five and six and the tile 5, which is the decoding target tile, coincides with the tile numbers in the independent tile position information. Accordingly, the independent tile determiner 706 determines that the decoding target tile is the tile in the independent tile set. The process goes to Step S1013.

In Step S1013, the decoding target tile is the independent tile. Since the higher-level layer is the base layer, the enlarger 909 receives the decoded image of the independent tile included in the independent tile set at the relatively same position of that of the decoding target tile from the decoded images on the base layer stored in the frame memory 908. The enlarger 909 performs enlargement using only the received decoded image of the independent tile with, for example, the filtering to generate the enlarged image and supplies the enlarged image to the enhancement layer decoder 710.

In Step S1014, the enhancement layer decoder 710 decodes the encoded data on the lower-level layer (the first enhancement layer) of the decoding target tile supplied from the separator 704, as in Step S814. The enhancement layer decoder 710 generates the decoded image with reference to the enlarged image supplied from the enlarger 909, the decoded image on the decoded enhancement layer (the first enhancement layer) stored in the frame memory 711, and the decoded pixels in the decoding target tile. Specifically, the enhancement layer decoder 710 performs the inter-layer prediction with reference to the enlarged image on the higher-level layer (the base layer) generated in Step S1013. The enhancement layer decoder 710 performs the inter-frame prediction with reference to the decoded image in the independent tile set at the relatively same position as that of the decoding target tile, among the decoded images on the lower-level layer (the first enhancement layer) stored in the frame memory 911. The enhancement layer decoder 710 performs the intra prediction with reference to the decoded image in the decoding target tile. The decoded image of the tile on the lower-level layer (the first enhancement layer) decoded by the enhancement layer decoder 710 is supplied to the frame memory 911 and is held in the frame memory 911.

In Step S1017, the controller 714 determines whether the decoding of the encoded data about all the tiles on the lower-level layer (the first enhancement layer) in the display area supplied from the separator 704 is finished. Since the decoding of the encoded data on the enhancement layer of the tile 6 is not finished here, the process goes back to Step S1011 to decode the encoded data on the lower-level layer (the first enhancement layer) of the tile 6.

The decoding of the encoded data on the lower-level layer (the first enhancement layer) of the tile 6 will now be described.

In Step S1011, the separator 704 extracts the encoded data on the lower-level layer (the first enhancement layer) of the tile 6, which is the decoding target tile, in the layer encoded data stored in the buffer 703. In Step S812, the independent tile determiner 706 compares the tile number of the decoding target tile with the tile number in the independent tile position information. Here, the independent tile determiner 706 determines that the tile 6, which is the decoding target tile, is the independent tile. The process goes to Step S1013.

In Step S1013, the enlarger 909 generates the enlarged image using only the received decoded image about the independent tile on the higher-level layer (the base layer). Specifically, the enlarger 909 receives the decoded image from the frame memory 908 and performs the enlargement using the received decoded image with, for example, the filtering to generate the enlarged image.

In Step S1014, the enhancement layer decoder 710 decodes the encoded data on the lower-level layer (the first enhancement layer) of the tile 6 to generate the decoded image and supplies the decoded image to the frame memory 911. In the decoding of the encoded data on the lower-level layer (the first enhancement layer) of the tile 6, the enhancement layer decoder 710 refers to the enlarged image supplied from the enlarger 909, the decoded image on the decoded enhancement layer stored in the frame memory 911, and the decoded pixels in the decoding target tile. Specifically, the enhancement layer decoder 710 performs the inter-layer prediction with reference to the enlarged image on the higher-level layer (the base layer) generated in Step S1013. The enhancement layer decoder 710 performs the inter-frame prediction with reference to the decoded image in the independent tile set at the relatively same position as that of the decoding target tile, among the decoded images on the lower-level layer (the first enhancement layer) stored in the frame memory 911. The enhancement layer decoder 710 performs the intra prediction with reference to the decoded image in the decoding target tile. The decoded image of the tile on the lower-level layer (the first enhancement layer) decoded by the enhancement layer decoder 710 is supplied to the frame memory 911 and is held in the frame memory 911.

In Step S1017, the controller 714 determines that the decoding of the encoded data about all the tiles on the lower-level layer (the first enhancement layer) in the display area is finished. The process goes to Step S1002.

In Step S1002, the controller 714 determines whether the decoding of all the layers represented by the decoded vps_max_layers_minus1 is finished. If the controller 714 determines that the decoding of the tiles of all the layers is not finished (NO in Step S1002), the process goes back to Step S1010 to perform the determination concerning the display. If the controller 714 determines that the decoding of the tiles of all the layers is finished (YES in Step S1002), the process goes to Step S1003. Since the decoding of the enhancement layer is not finished here, the enhancement layer decoder 710 determines that the decoding of the tiles of all the layers is not finished. The process goes back to Step S1010.

The decoding of the second enhancement layer is performed here. In Step S1010, the enhancement layer decoder 710 determines whether the layer to be displayed is decoded. The layer to be displayed is the second enhancement layer on the basis of the display control signal supplied from the terminal 702. Since the enhancement layer decoder 710 determines that the decoding is finished to the first enhancement layer (the second enhancement layer is not decoded) (NO in Step S1010), the process goes to Step S1001. In Step S1001, the enhancement layer decoder 710 sets the first enhancement layer decoded in Step S1014 or Step S1016 as the higher-level layer and sets the second enhancement layer as the lower-level layer.

In Step S1011, the separator 704 extracts the encoded data about the tile on the lower-level layer (the second enhancement layer) in the layer encoded data stored in the buffer 703 and supplies the extracted encoded data to the enhancement layer decoder 710. Here, the separator 704 extracts the encoded data on the lower-level layer (the second enhancement layer) of the tile 5 and supplies the extracted encoded data to the enhancement layer decoder 710. In Step S812, the independent tile determiner 706 determines that the tile 5, which is the decoding target tile, is the independent tile. The process goes to Step S1013. In Step S1013, the higher-level layer is the enhancement layer (the first enhancement layer). Accordingly, the enlarger 909 receives the decoded image of the independent tile included in the independent tile set at the relatively same position of that of the decoding target tile from the decoded images on the higher-level layer (the first enhancement layer) stored in the frame memory 908. The enlarger 909 performs the enlargement using only the received decoded image of the independent tile on the higher-level layer (the first enhancement layer) with, for example, the filtering to generate the enlarged image and supplies the enlarged image to the enhancement layer decoder 710.

In Step S1014, the enhancement layer decoder 710 decodes the encoded data on the lower-level layer (the second enhancement layer) of the decoding target tile supplied from the separator 704. The enhancement layer decoder 710 generates the decoded image with reference to the following images. Specifically, the enhancement layer decoder 710 refers to the enlarged image on the higher-level layer (the first enhancement layer) supplied from the enlarger 909, the decoded image on the decoded enhancement layer (the second enhancement layer) stored in the frame memory 911, and the decoded pixels in the decoding target tile. More specifically, the enhancement layer decoder 710 performs the inter-layer prediction with reference to the enlarged image on the higher-level layer (the first enhancement layer) generated in Step S1013. The enhancement layer decoder 710 performs the inter-frame prediction with reference to the decoded image in the independent tile set at the relatively same position as that of the decoding target tile, among the decoded images on the lower-level layer (the second enhancement layer) stored in the frame memory 911. The enhancement layer decoder 710 performs the intra prediction with reference to the decoded image in the decoding target tile. The decoded image of the tile on the lower-level layer (the second enhancement layer) decoded by the enhancement layer decoder 710 is supplied to the frame memory 911 and is held in the frame memory 911.

In Step S1017, the controller 714 determines whether the decoding of the encoded data about all the tiles on the lower-level layer (the second enhancement layer) in the display area supplied from the separator 704 is finished. Since the decoding of the encoded data on the enhancement layer of the tile 6 is not finished here, the process goes back to Step S1011 to decode the encoded data on the lower-level layer (the second enhancement layer) of the tile 6. Since the decoding of the lower-level layer of the tile 6 is performed in the same manner as in the decoding of the encoded data on the second enhancement layer of the tile 5, a description of the decoding of the lower-level layer of the tile 6 is omitted herein. However, in this case, the first enhancement layer is set as the higher-level layer and the second enhancement layer is set as the lower-level layer.

In Step S1002, the controller 714 determines that the decoding of the tiles of all the layers is finished because the decoding of the second enhancement layer is finished. The process goes to Step S1003. In Step S1003, the selector 920 selects the decoded image on the lowest-level layer, among the decoded layers. In this case, since the lowest-level layer is the second enhancement layer, the selector 920 reads out the decoded image on the second enhancement layer from the frame memory 911 and supplies the decoded image on the second enhancement layer to the display unit 606 in FIG. 6 via the terminal 912. The display unit 606 displays the entire decoded image on the second enhancement layer supplied from the image decoding unit 605 in response to an instruction to display the image on the second enhancement layer from the display control unit 603.

The layer to be displayed is the second enhancement layer (the number of layers is three) in the above description. However, when the number of layers of the encoded data in the hierarchical coding is three or more and the layer to be displayed is the first enhancement layer (the number of layers is two), after the decoding of the first enhancement layer is finished (NO in Step S1002), the process goes back to Step S1010 and then goes to Step S1003. Accordingly, the decoding of the encoded data on the layers higher than the second enhancement layer is not performed.

The case is described above in which the display area (the decoding target tile) is composed of the independent tile set. A case will now be described in which the display area (the decoding target tile) is not composed of the independent tile set. Step S801 to Step S805 are performed in the above manner.

In Step S806, the independent tile determiner 706 determines that the decoding target tile is not the independent tile. The process goes to step S808. In Step S808, the base layer decoder 707 decodes the tile on the base layer to generate the decoded image and stores the generated decoded image in the frame memory 908, as in the case in which the decoding target layer is only the base layer.

In Step S809, the controller 714 determines whether the decoding of the encoded data about all the tiles corresponding to one frame on the base layer is finished. The controller 714 determines here that the base layer decoder 707 finishes the decoding of the encoded data about all the tiles corresponding to one frame on the base layer (YES in Step S809). The process goes to Step S1010. In Step S1010, the base layer decoder 707 or the enhancement layer decoder 710 determines that the layer to be displayed is not decoded (NO in Step S1010) because the display is to be performed to the second enhancement layer. The process goes to Step S1001.

In Step S1001, the enhancement layer decoder 710 sets the base layer decoded in Step S808 as the higher-level layer and sets the succeeding enhancement layer to be decoded (the first enhancement layer) as the lower-level layer. In Step S1011, the separator 704 receives the positional information about the tiles in the display area supplied from the terminal 702. The separator 704 extracts the encoded data on the lower-level layer (the first enhancement layer) of the decoding target tile in the layer encoded data stored in the buffer 703, on the basis of the received positional information. In Step S812, the independent tile determiner 706 compares the tile number of the decoding target tile with the tile number in the independent tile position information. The tile 5, which is the decoding target tile, does not coincide with the tile number in the independent tile position information here. Accordingly, the independent tile determiner 706 determines that the decoding target tile is not the tile in the independent tile set (NO in Step S812). The process goes to Step S1015.

In Step S1015, the enlarger 909 receives the decoded images of the tile on the base layer at the relatively same position as that of the decoding target tile and tiles around the tile from the decoded images on the higher-level layer (the base layer) stored in the frame memory 708. The enlarger 909 performs the enlargement using only the received decoded images of the tiles on the base layer with, for example, the filtering to generate the enlarged image and supplies the generated enlarged image to the enhancement layer decoder 710.

In Step S1016, the enhancement layer decoder 710 decodes the encoded data on the lower-level layer (the first enhancement layer) of the decoding target tile supplied from the separator 704. The enhancement layer decoder 710 generates a prediction image with reference to the following images. Specifically, the enhancement layer decoder 710 refers to the enlarged image on the higher-level layer (the base layer) supplied from the enlarger 909, the decoded image on the decoded lower-level layer (the first enhancement layer) stored in the frame memory 911, and the decoded pixels on the lower-level layer (the first enhancement layer) of the decoding target tile. The enhancement layer decoder 710 generates the decoded image from the prediction image generated through the reference and the decoded prediction error. More specifically, the enhancement layer decoder 710 performs the inter-layer prediction with reference to the enlarged image on the higher-level layer (the base layer) generated in Step S1015. The enhancement layer decoder 710 performs the inter-frame prediction with reference to the decoded image on the lower-level layer (the first enhancement layer) stored in the frame memory 711. The enhancement layer decoder 710 performs the intra prediction with reference to the decoded image in the decoding target tile on the lower-level layer (the first enhancement layer). The decoded image of the tile on the lower-level layer (the first enhancement layer) generated by the enhancement layer decoder 710 is supplied to the frame memory 911 and is held in the frame memory 911.

In Step S1017, the controller 714 determines whether the decoding of the encoded data about all the tiles on the lower-level layer (the first enhancement layer) in the display area is finished. The controller 714 determines here that the enhancement layer decoder 710 finishes the decoding of the encoded data about all the tiles on the first enhancement layer (YES in Step S1017). The process goes to Step S1002. In Step S1002, the controller 714 determines whether the decoding of all the layers is finished. The controller 714 determines here that the enhancement layer decoder 710 does not finish the decoding of the second enhancement layer (NO in Step S1002). The process goes back to Step S1010.

The decoding of the second enhancement layer is performed here. In Step S1010, the enhancement layer decoder 710 determines that the decoding of the second enhancement layer to be displayed is not finished (NO in Step S1010). The process goes to Steps 1001. In Step S1001, the enhancement layer decoder 710 sets the first enhancement layer decoded in Step S1016 as the higher-level layer and sets the second enhancement layer as the lower-level layer. In Step S1011, the separator 704 extracts the encoded data about the decoding target tile on the lower-level layer (the second enhancement layer) and supplies the extracted encoded data to the enhancement layer decoder 710. In Step S812, the independent tile determiner 706 determines that the decoding target tile is not the tile in the independent tile set (NO in Step S812). The process goes to Step S1015. In Step S1015, the enlarger 909 receives the decoded image on the enhancement layer (the first enhancement layer) stored in the frame memory 908 because the higher-level layer is the enhancement layer (the first enhancement layer). The enlarger 909 performs the enlargement using the received decoded image on the higher-level layer (the first enhancement layer) with, for example, the filtering to generate the enlarged image. Here, the enlarger 909 may use the tile at the relatively same position as that of the decoding target tile and the pixels around the tile to generate the enlarged image. The enlarger 909 supplies the generated enlarged image to the enhancement layer decoder 710.

In Step S1016, the enhancement layer decoder 710 decodes the encoded data on the lower-level layer (the second enhancement layer) of the decoding target tile supplied from the separator 704. The enhancement layer decoder 710 generates the decoded image with reference to the enlarged image on the higher-level layer (the first enhancement layer) supplied from the enlarger 909, the decoded image on the decoded enhancement layer (the second enhancement layer) stored in the frame memory 911, and the decoded pixels in the decoding target tile. Specifically, the enhancement layer decoder 710 performs the inter-layer prediction with reference to the enlarged image on the higher-level layer (the first enhancement layer) generated in Step S1015. The enhancement layer decoder 710 performs the inter-frame prediction with reference to the decoded image on the lower-level layer (the second enhancement layer) stored in the frame memory 911. The enhancement layer decoder 710 performs the intra prediction with reference to the decoded image in the decoding target tile. The decoded image of the tile on the lower-level layer (the second enhancement layer) decoded by the enhancement layer decoder 710 is supplied to the frame memory 911 and is held in the frame memory 911.

In Step S1017, the controller 714 determines whether the decoding of the encoded data about all the tiles on the lower-level layer (the second enhancement layer) in the display area supplied from the separator 704 is finished. Since the controller 714 determines here that the enhancement layer decoder 710 finishes the decoding of the encoded data about all the tiles on the second enhancement layer. The process goes to Step S1002. In Step S1002, the controller 714 determines that the decoding of the tiles on all the layers is finished (YES in Step S1002) because the decoding of the second enhancement layer is finished. The process goes to Step S1003. In Step S1003, the selector 920 selects the decoded image on the lowest-level layer, among the decoded layers. In this case, since the lowest-level layer is the second enhancement layer, the selector 920 reads out the decoded image from the frame memory 911 and supplies the decoded image that is read out to the display unit 606 in FIG. 6 via the terminal 912. The display unit 606 displays the decoded image on the second enhancement layer supplied from the image decoding unit 605 in response to an instruction to display the image on the second enhancement layer from the display control unit 603.

The layer to be displayed is the second enhancement layer (the number of layers is three) in the above description. However, when the number of layers of the encoded data in the hierarchical coding is three or more and the layer to be displayed is the first enhancement layer (the number of layers is two), after the decoding of the first enhancement layer is finished (NO in Step S1002), the process goes back to Step S1010 and then goes to Step S1003. Accordingly, the decoding of the encoded data on the layers higher than the second enhancement layer is not performed.

With the above configuration and operation, it is possible to match the relative position of each independent tile on each enhancement layer with the relative position of the independent tile on the base layer. In other words, when a certain tile on the base layer is set as the independent tile, the tile at the relative same position as that of the independent tile on the base layer is the independent tile on each enhancement layer. This allows the number of pixels to be referred to for the prediction and the decoding of the encoded data about the independent tile to be limited in any layer in the hierarchical coding. In particular, in the example in FIG. 6, if the tile the display of which is specified by the display control unit 603 is the independent tile, necessary encoded data may be read out from the storage unit 602. The image decoding unit 605 may decode only the encoded data. Accordingly, it is possible to realize the high-speed processing, compared with the related art.

When the MCTS SEI exists in the bit stream, the tile_boundaries_aligned_flag of the vui_parameters, which is the coincidence information about the tile position, is constantly set to one. In other words, when the MCTS SEI exists in the bit stream in the vui_parameters, the tile_boundaries_aligned_flag as the encoded data may be omitted. If no MCTS SEI exists in the bit stream, the tile_boundaries_aligned_flag is decoded and the decoded data is referred to in the subsequent decoding. If the MCTS SEI exists in the bit stream, the tile_boundaries_aligned_flag is constantly set to one at the decoding side because the tile_boundaries_aligned_flag is not encoded. This allows the decoding to be performed in the same manner without the tile_boundaries_aligned_flag.

Third Embodiment

The processing units illustrated in FIG. 1, FIG. 4, FIG. 6, FIG. 7, and FIG. 9 are configured as hardware in the first embodiment and the second embodiment. However, the processes performed in the processing units may be executed by computer programs.

Figure 11:
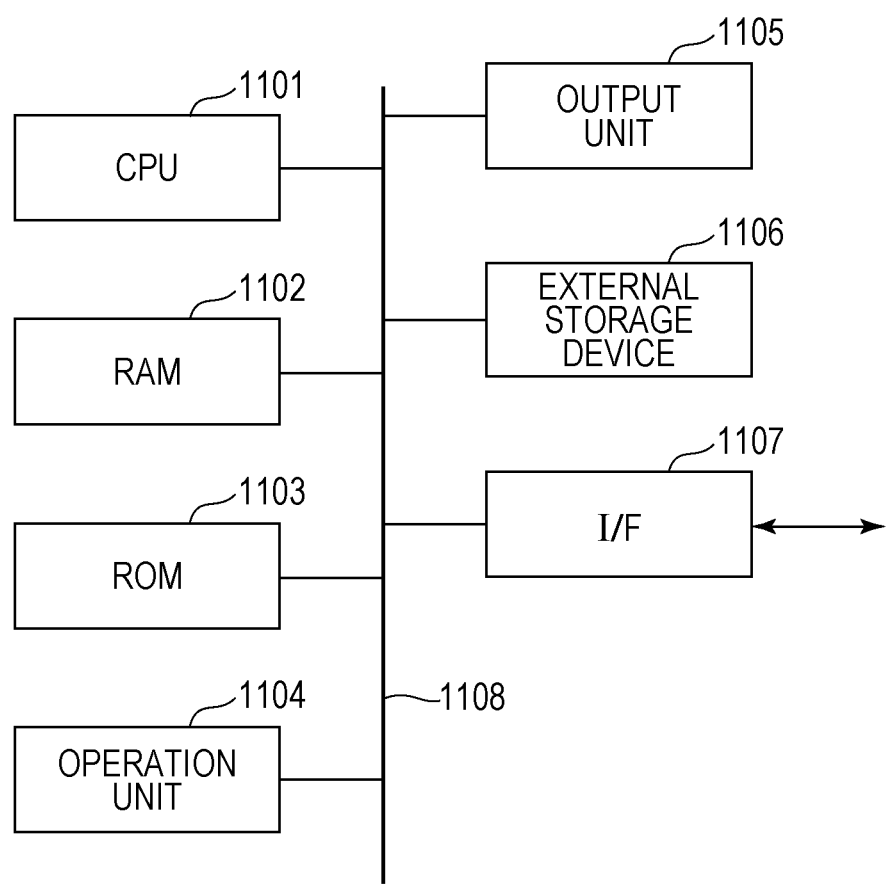
FIG. 11 is a block diagram illustrating an exemplary hardware configuration of a computer applicable to the image encoding apparatus according to the first embodiment and the image decoding apparatus according to the second embodiment.
Figure 13:
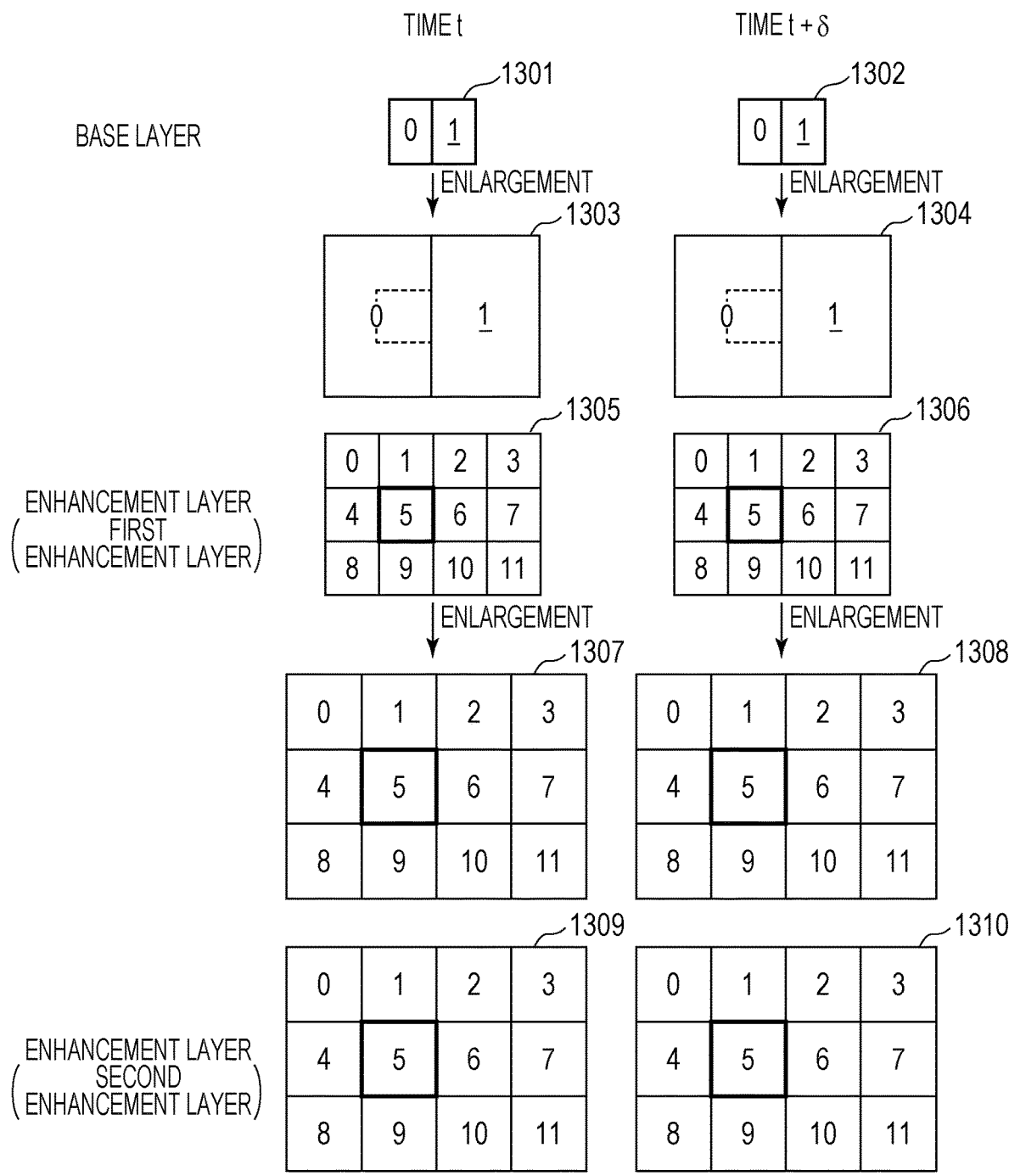
FIG. 13 illustrates an exemplary tile structure in related art.

FIG. 11 is a block diagram illustrating an exemplary hardware configuration of a computer that executes the processing in each processing unit in the image encoding apparatus according to the first embodiment and the image decoding apparatus according to the second embodiment.

Referring to FIG. 11, a central processing unit (CPU) 1101 controls the entire computer using computer programs and data stored in a random access memory (RAM) 1102 and a read only memory (ROM) 1103 and executes the processes described above performed by the image encoding apparatus according to the first embodiment and the image decoding apparatus according to the second embodiment. In other words, the CPU 1101 functions as each processing unit illustrated in FIG. 1, FIG. 4, FIG. 6, FIG. 7, and FIG. 9.

The RAM 1102 has an area in which computer programs and data loaded from an external storage device 1106, data externally acquired via an interface (I/F) 1107, and so on are temporarily stored. The RAM 1102 also has a working area used by the CPU 1101 to execute the various processes. In other words, the RAM 1102 is capable of, for example, being allocated as the frame memory and appropriately providing various other areas.

The ROM 1103 stores setting data, a boot program, and so on of the computer. An operation unit 1104 is composed of a keyboard, a mouse, etc. and is capable of issuing various instructions to the CPU 1101 in response to operations by the user. An output unit 1105 performs control to display the processing result by the CPU 1101. The output unit 1105 also performs control to display the processing result by the CPU 1101 in a display unit (not illustrated) composed of, for example, a liquid crystal display.

The external storage device 1106 is a mass storage device, typified by a hard disk drive. An operating system (OS) and the computer programs used by the CPU 1101 to realize the function of the processing units illustrated in FIG. 1, FIG. 4, FIG. 6, FIG. 7, and FIG. 9 are stored in the external storage device 1106. The image data to be processed may be stored in the external storage device 1106.

The computer programs and the data stored in the external storage device 1106 are appropriately loaded into the RAM 1102 under the control of the CPU 1101 to be processed by the CPU 1101. A network, such as a local area network (LAN) or the Internet, and another device, such as a projection apparatus or a display apparatus, may be connected to the I/F 1107. The computer is capable of acquiring and transmitting a variety of information via the I/F 1107. The above components are connected to each other via a bus 1108.

The operations in the above configurations, which are described above with reference to the flowcharts, are mainly controlled by the CPU 1101.

Other Embodiments

In order to easily realize the present invention, it is useful to explicitly indicate the presence of the independent tile at a level close to the head of the bit stream. For example, a method using the vui_parameters will now be described with reference to FIG. 12. FIG. 12 illustrates an example of the syntax of the vui_parameters. Motion_constrained_tile_sets_flag indicating that the independent tile constantly exists in the bit stream is included in the vui_parameters. If the motion_constrained_tile_sets_flag is set to one, the MCTS SEI is included, the independent tile exists in the bit stream, and the relative position of each tile on the base layer coincides with the relative position of the tile on the enhancement layer. In other words, since the tile_boundaries_aligned_flag is constantly set to one, it is not necessary to encode the tile_boundaries_aligned_flag. In contrast, if the motion_constrained_tile_sets_flag is set to zero, the MCTS SEI is not included and no independent tile exists in the bit stream. Accordingly, it is necessary to encode the tile_boundaries_aligned_flag. Such an image decoding apparatus that decodes the bit stream is capable of acquiring information indicating that the independent tile is included in the bit stream before the decoding process of each tile is performed. Accordingly, it is possible for the image decoding apparatus to perform the decoding process at high speed using the independent tile in the decoding of a certain area. As a result, it is possible to determine whether, for example, a partial enlargement application is effective before the decoding process of each tile is performed.

The size of the image, the number of tiles resulting from division, and the position of the independent tile in one frame are not limited to the ones described in the above embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image encoding apparatus that performs hierarchical encoding for images composing a moving image with a plurality of layers, the image encoding apparatus comprising:
   a first generating unit that generates a second image of a base layer different from that of a first image, the first image being an image of a non-base layer, and the second image corresponding to the first image;
   an encoding unit that encodes a first area in the first image, and a second area, corresponding to the first area, in the second image; and
   an information encoding unit,
   wherein, in a case where the first area in the first image of the non-base layer is an area being constrained so as not to refer to an area in the first image except for the first area, and the first area in the first image of the non-base layer is an area to be encoded using inter-layer prediction which refers to at least a part of an area of the second image of the base layer,
   (a) the encoding unit encodes the first area with solely reference to the second area as the part of the area in the second image,
   (b) the encoding unit encodes the second area without reference to another area in the second image,
   (c) the information encoding unit encodes information which indicates that reference to an area except for the second area is constrained in the inter-layer prediction in a case where the second image is referred to in the first area, and
   (d) a boundary of the first area and a boundary of the second area are constrained so that the boundary of the first area and the boundary of the second area are aligned.

2. The image encoding apparatus according to claim 1, wherein the first area and the second area are tiles.

3. The image encoding apparatus according to claim 2, wherein the first area and the second area are tiles which are capable of being independently processed.

4. The image encoding apparatus according to claim 1, wherein the first image and the second image are different from each other in resolution or image quality.

5. The image encoding apparatus according to claim 1, wherein the second image has resolution or image quality lower than that of the first image.

6. The image encoding apparatus according to claim 1, wherein the first image is an image of an enhancement layer.

7. An image decoding apparatus that decodes encoded data resulting from hierarchical encoding for images with a plurality of layers, the images being divided into multiple areas, the images composing a moving image, the image decoding apparatus comprising:
   a decoding unit that decodes a first area in a first image of a non-base layer, and a second area, corresponding to the first area, in the second image of a base layer different from the non-base layer, the second image corresponding to the first image; and
   an information decoding unit that decodes information which indicates that reference to an area except for the second area is constrained in the inter-layer prediction in a case where the second image is referred to in the first area,
   wherein, in a case where the first area in the first image of the non-base layer is an area being constrained so as not to refer to an area in the first image except for the first area, and the first area in the first image of the non-base layer is an area to be decoded using inter-layer prediction which refers to at least a part of an area of the second image of the base layer, and the information is decoded by the information decoding unit;

the decoding unit decodes the first area with solely reference to the second area as the part of the area in the second image;

the decoding unit decodes the second area without reference to another area in the second image; and a boundary of the first area and a boundary of the second area are constrained so that the boundary of the first area and the boundary of the second area are aligned.

8. The image decoding apparatus according to claim 7, wherein the first area and the second area are tiles.

9. The image decoding apparatus according to claim 8, wherein the first area and the second area are tiles which are capable of being independently processed.

10. The image decoding apparatus according to claim 7, wherein the first image and the second image are different from each other in resolution or image quality.

11. The image decoding apparatus according to claim 7, wherein the second image has resolution or image quality lower than that of the first image.

12. The image decoding apparatus according to claim 7, wherein the first image is an image of an enhancement layer.

13. An image encoding method that performs hierarchical encoding for images composing a moving image with a plurality of layers, the image encoding method comprising:

generating a second image of a base layer different from that of a first image, the first image being an image of a non-base layer, and the second image corresponding to the first image; and encoding a first area in the first image, and a second area, corresponding to the first area, in the second image, wherein, in a case where the first area in the first image of the non-base layer is an area being constrained so as not to refer to an area in the first image except for the first area, and the first area in the first image of the non-base layer is an area to be encoded using inter-layer prediction which refers to at least a part of an area of the second image of the base layer, (a) encoding the first area with solely reference to the second area as the part of the area in the second image, (b) encoding the second area without reference to another area in the second image, (c) encoding information which indicates that reference to an area except for the second area is constrained in the inter-layer prediction in a case where the second image is referred to in the first area, and (d) a boundary of the first area and a boundary of the second area are constrained so that the boundary of the first area and the boundary of the second area are aligned.

14. An image decoding method that decodes encoded data resulting from hierarchical encoding for images with a plurality of layers, the images being divided into multiple areas, the images composing a moving image, the image decoding method comprising:

decoding a first area in a first image of a non-base layer, and a second area, corresponding to the first area, in the second image of a base layer different from the non-base layer, the second image corresponding to the first image; and decoding information which indicates that reference to an area except for the second area is constrained in the inter-layer prediction in a case where the second image is referred to in the first area, wherein, in a case where the first area in the first image of the non-base layer is an area being constrained so as not to refer to an area in the first image except for the first area, and the first area in the first image of the non-base layer is an area to be decoded using inter-layer prediction which refers to at least a part of an area of the second image of the base layer, and the information is decoded;

decoding the first area with solely reference to the second area as the part of the area in the second image;

decoding the second area without reference to another area in the second image; and a boundary of the first area and a boundary of the second area are constrained so that the boundary of the first area and the boundary of the second area are aligned.

15. A non-transitory computer-readable storage medium storing a program for executing n image encoding method that performs hierarchical encoding for images composing a moving image with a plurality of layers, the image encoding method comprising:

generating a second image of a base layer different from that of a first image, the first image being an image of a non-base layer, and the second image corresponding to the first image; and encoding a first area in the first image, and a second area, corresponding to the first area, in the second image, wherein, in a case where the first area in the first image of the non-base layer is an area being constrained so as not to refer to an area in the first image except for the first area, and the first area in the first image of the non-base layer is an area to be encoded using inter-layer prediction which refers to at least a part of an area of the second image of the base layer, (a) encoding the first area with solely reference to the second area as the part of the area in the second image, (b) encoding the second area without reference to another area in the second image, (c) encoding information which indicates that reference to an area except for the second area is constrained in the inter-layer prediction in a case where the second image is referred to in the first area, and (d) a boundary of the first area and a boundary of the second area are constrained so that the boundary of the first area and the boundary of the second area are aligned.

16. A non-transitory computer-readable storage medium storing a program for executing an image decoding method that decodes encoded data resulting from hierarchical encoding for images with a plurality of layers, the images being divided into multiple areas, the images composing a moving image, the image decoding method comprising:

decoding a first area in a first image of a non-base layer, and a second area, corresponding to the first area, in the second image of a base layer different from the non-base layer, the second image corresponding to the first image; and decoding information which indicates that reference to an area except for the second area is constrained in the inter-layer prediction in a case where the second image is referred to in the first area, wherein, in a case where the first area in the first image of the non-base layer is an area being constrained so as not to refer to an area in the first image except for the first area, and the first area in the first image of the non-base layer is an area to be decoded using inter-layer prediction which refers to at least a part of an area of the second image of the base layer, and the information is decoded;

decoding the first area with solely reference to the second area as the part of the area in the second image, and;
decoding the second area without reference to another area in the second image; and
a boundary of the first area and a boundary of the second area are constrained so that the boundary of the first area and the boundary of the second area are aligned.

\* \* \* \* \*